United States Patent [19]

Mogi

[11] Patent Number: 5,969,796
[45] Date of Patent: Oct. 19, 1999

[54] METHOD FOR DETERMINING A STATE OF PROCESSING SOLUTION IN A PRINTER PROCESSOR AND A PRINTER PROCESSOR

[75] Inventor: Fumio Mogi, Kanagawa, Japan

[73] Assignee: Fuji Photo Film Co., Ltd., Kanagawa, Japan

[21] Appl. No.: 08/899,316

[22] Filed: Jul. 30, 1997

[30] Foreign Application Priority Data

Jul. 30, 1996 [JP] Japan .................................. 8-200676
Jul. 30, 1996 [JP] Japan .................................. 8-200677

[51] Int. Cl.[6] ............................ G03B 27/32; G03B 27/80
[52] U.S. Cl. ............................ 355/27; 396/569; 396/570; 355/38
[58] Field of Search .................................. 355/27–29, 69, 355/77, 38; 396/568, 529, 570, 578, 569

[56] References Cited

U.S. PATENT DOCUMENTS

| | | | |
|---|---|---|---|
| 3,462,221 | 8/1969 | Tajima et al. ............................. | 355/27 |
| 5,083,154 | 1/1992 | Terashita et al. ........................ | 355/77 |
| 5,319,408 | 6/1994 | Shiota ..................................... | 396/578 |
| 5,517,271 | 5/1996 | Yamaguchi et al. ..................... | 396/578 |

FOREIGN PATENT DOCUMENTS

| | | | |
|---|---|---|---|
| 6-236018 | 8/1994 | Japan ............................... | G03D 3/06 |
| 7-159965 | 6/1995 | Japan ............................... | G03D 3/00 |
| 8-339041 | 12/1996 | Japan ............................... | G03B 27/72 |

*Primary Examiner*—D. Rutledge
*Attorney, Agent, or Firm*—Sughrue, Mion, Zinn, Macpeak & Seas, PLLC

[57] ABSTRACT

A method for determining a state of a processing solution in a printer processor which exposes a photosensitive material to a light emitted from a light source and processes the material with processing solution, the printer processor having a function to correct exposure conditions in response to at least the amount of light from the light source, a characteristic of the photosensitive material, and a state of the processing solution by adjusting a plurality of exposure condition correction parameter values, comprising the steps of: (a) storing change history of at least one of the exposure condition correction parameter values; and (b) determining whether or not the state of the processing solution is in a preferable state based on the stored change history of at least one of the correction parameter values. Therefore, the characteristics of the change in the processing solution state appear in the history of change of the exposure condition correction parameter values. In other words, the processing solution can be determined whether or not it is in a preferable state based on the history of change of the correction parameter values.

24 Claims, 34 Drawing Sheets

F I G. 4
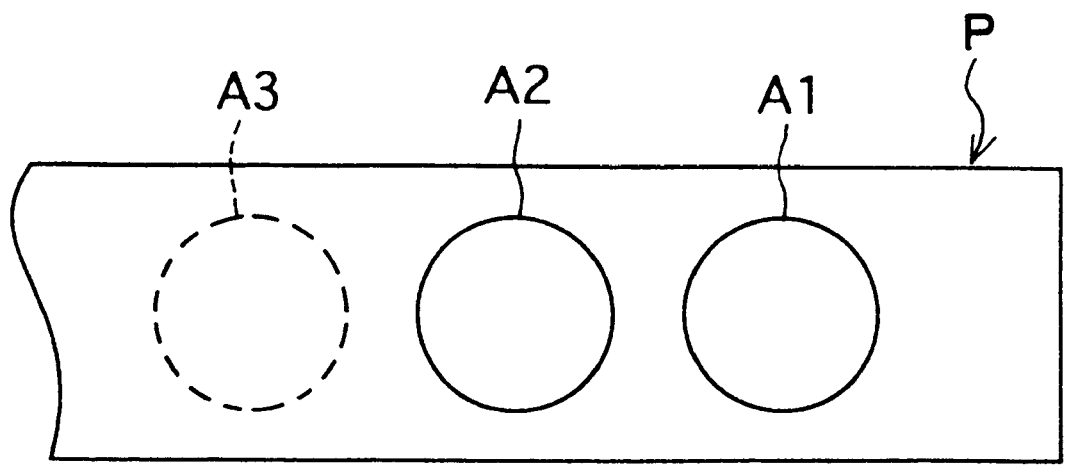

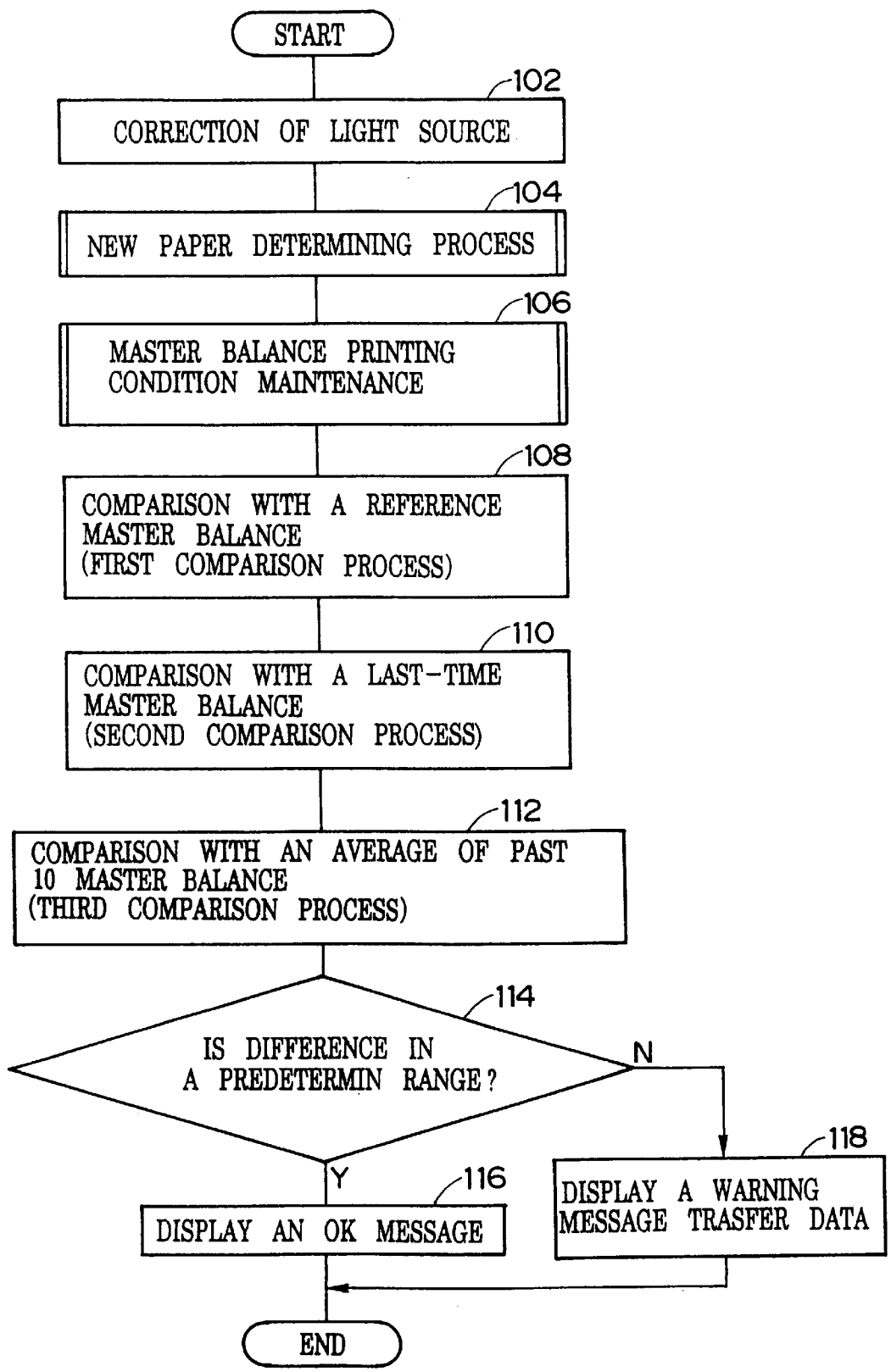
F I G. 5

FIG. 14 CHANGE IN MASTER BALANCE IN OPERATION

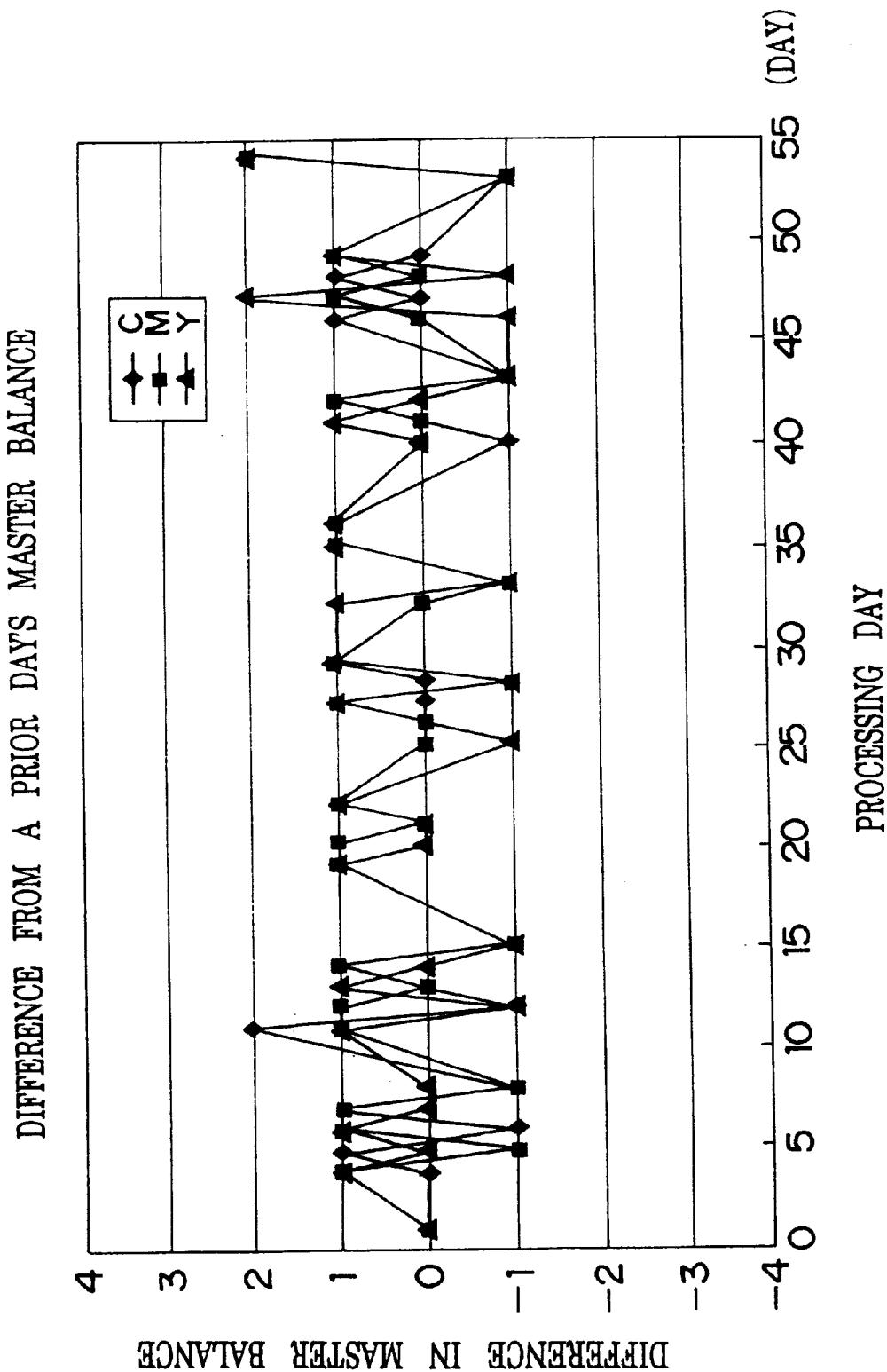

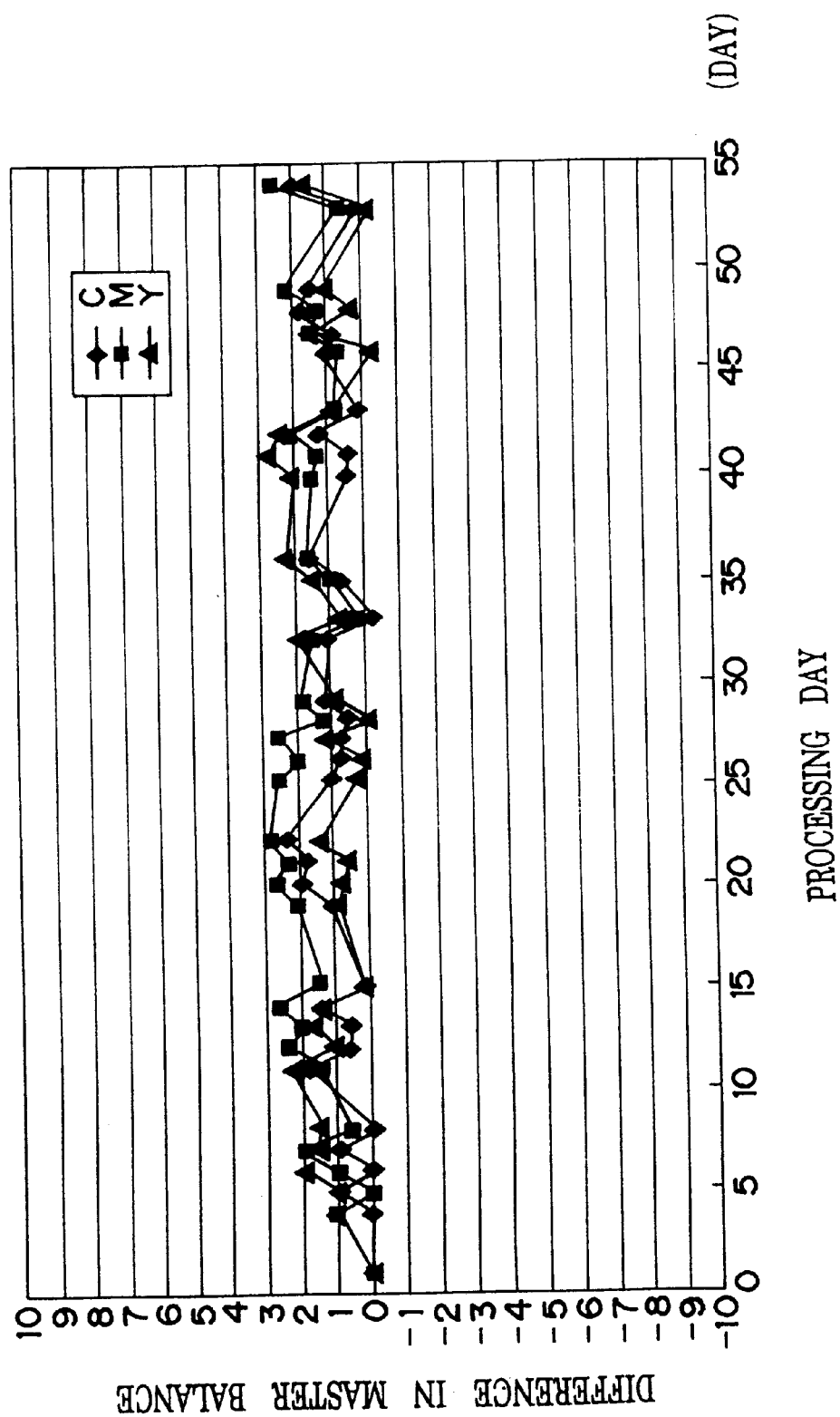

FIG. 22A

| CONTROL STRIP SAMPLE DENSITY | CYAN | MAGENTA | YELLOW |
|---|---|---|---|
| HD | 2.11 | 1.89 | 1.75 |
| LD | 1.03 | 0.76 | 0.78 |
| STAIN | 0.10 | 0.11 | 0.12 |
| HD-LD | 1.08 | 1.13 | 0.97 |

FIG. 22B

| (CONTROL STRIP SAMPLE DENSITY − CONTROL STRIP REFERENCE DENSITY) × 100 | CYAN | MAGENTA | YELLOW |
|---|---|---|---|
| HD | 46 | 30 | 17 |
| LD | 34 | 12 | 15 |
| STAIN | 1 | 2 | 5 |
| HD-LD | 12 | 18 | 2 |

FIG. 23A

| CONTROL STRIP SAMPLE DENSITY | CYAN | MAGENTA | YELLOW |
|---|---|---|---|
| HD | 1.73 | 1.65 | 1.63 |
| LD | 0.70 | 0.66 | 0.67 |
| STAIN | 0.09 | 0.10 | 0.09 |
| HD-LD | 1.03 | 0.99 | 0.96 |

FIG. 23B

| (CONTROL STRIP SAMPLE DENSITY − CONTROL STRIP REFERENCE DENSITY) × 100 | CYAN | MAGENTA | YELLOW |
|---|---|---|---|
| HD | 8 | 7 | 6 |
| LD | 0 | 1 | 3 |
| STAIN | 0 | 1 | 2 |
| HD-LD | 8 | 6 | 3 |

F I G. 24

|  | CYAN | MAGENTA | YELLOW |
|---|---|---|---|
| LD ON THE 1ST DAY | 0 | 1 | 3 |
| LD ON THE 54TH DAY | 34 | 12 | 15 |
| DEIFFERENCE OF LDS ON BOTH DAYS | 34 | 11 | 12 |
| DIFFERENCE OF MASTER BALANCE ON BOTH DAYS | -23 | -8 | -11 |

F I G. 2 5

|  | CYAN | MAGENTA | YELLOW |
|---|---|---|---|
| LD ON THE 1ST DAY | 0 | 1 | 3 |
| LD ON THE 54TH DAY | 6 | 12 | 12 |
| DEIFFERENCE OF LDS ON BOTH DAYS | 6 | 11 | 8 |
| DIFFERENCE OF MASTER BALANCE ON BOTH DAYS | -7 | -11 | -10 |

A1

METHOD FOR DETERMINING A STATE OF PROCESSING SOLUTION IN A PRINTER PROCESSOR AND A PRINTER PROCESSOR

FIELD OF THE INVENTION

The present invention relates to a method for determining or judging a state of processing solution in a printer processor and a printer processor. More specifically, this invention relates to a method for determining a state of processing solution in a printer processor and a printer processor which exposes a photosensitive material, or photographic printing paper, to a light emitted from a light source for recording an image thereon and processes the photosensitive material by the processing solution, the printer processor having a function for correcting exposure conditions in response to at least the amount of light from the light source, characteristics of the photosensitive material, and a state of the processing solution by adjusting values of a plurality of exposure condition correction parameters.

DESCRIPTION OF THE RELATED ART

Generally, with a printer processor used in a small scale photo developing laboratory, print is obtained by exposing a paper, or photographic printing paper, to a light for recording an image on a developed negative film on the paper and then by developing, fixing, and rinsing the exposed paper using a processing solution in a processing section, and finally by drying the paper. The processing of the paper by the processing section is performed using exclusive processing solution for each of the developing, fixing, and rinsing process. For maintaining the performance of the processing solution, the processing solution is replenished with replenishing solution. However, the processing solution loses an appropriate performance level as the time the solution is used is prolonged, due to effects of evaporation, decrease or increase in liquid volume by bringing-in and/or carrying-out of the processing solution, oxidation by air, or thermal degradation. Therefore, for constantly maintaining preferable quality of print, it is necessary to constantly control a state of the processing solution used in the above processing.

A conventional printer processor controls the state of the processing solution so that the processing solution maintains an appropriate condition (a reference state) by processing a control strip, which is composed of a plurality of image frames which have been produced under a plurality of exposing conditions, in a paper processor section and then measuring density of each frame on the processed control strip, and finally comparing the measured density on each frame to each reference density. (Hereafter, the processing as described above for maintaining a state of the processing solution using the control strip is called a control strip processing.)

Using a control tool such as the control strip described above is troublesome, because an operator for the printer processor have to store and manage the control tools. Therefore, a technique to control the processing solution state without using prepared control tools has been proposed (See Japanese Patent Application Laid-Open Nos. 6-236018, and 7-159965).

In Japanese Patent Application Laid-Open No. 6-236018, a technique to produce a tool equivalent to the control strip by exposing an ordinary paper under a reference exposing condition (a reference density of a negative film, a reference amount of light) using an exclusive negative film and an exclusive light source for reference exposure, and then to control a state of the processing solution as the above-described control strip processing using the tool equivalent to the control strip has been proposed.

However, in this technique, exposure under the reference exposure condition is intended when the tool equivalent to the control strip is produced. Since this technique uses an ordinary photosensitive material, or photographic printing paper, either variations in characteristics of photosensitive materials to be exposed or factors causing changes in the characteristics is not considered.

In fact, when an ordinary or commercially available photographic printing paper is exposed, processed, and the state of the processing solution used for the processing is determined on the basis of the density of the printing paper thus processed the density of the processed printing paper varies considerably depending upon the characteristics of the exposed and processed printing paper and the exposure conditions, even when the exposure was carried out with a light source controlled to maintain a predetermined state and the processing solution is in a predetermined state.

The density of the photographic printing paper which has been exposed and processed also varies depending on not only the kind and the manufacturer of the processing solution but also a manufacturing lot, when the paper is ordinary or commercially available. Moreover, even when the manufacturing lot is the same, the characteristics of the photographic printing paper vary depending on conditions such as storage conditions.

As described above, it is not easy to appropriately determine the state of the processing solution using an ordinary photographic printing paper.

The applicant of the present invention has therefore proposed a technique in a prior application (Japanese Patent Application Laid-Open No. 8-339041) to determine the state of the processing solution by storing in a printer processor characteristic information (reference density) of the photosensitive material measured in advance based on manufacturing lot or emulsion number thereof, and then reading the reference density corresponding to the photosensitive material having been exposed and processed, and finally comparing the reference density to the measured density of the photosensitive material.

However, the photosensitive materials whose characteristic information has been disclosed can be managed properly with this technique, while this technique is not applicable on the photosensitive materials whose characteristic information has been unknown.

SUMMARY OF THE INVENTION

The present invention has been created to solve the above-described problems. Its object is to provide a method for determining a state of a processing solution in a printer processor and the printer processor which can control the state of the processing solution easily and accurately, based on characteristics of any kind of photosensitive materials or photographic printing papers.

To achieve the above-described object, a first aspect of the present invention is a method for determining a state of processing solution in a printer processor which exposes a photosensitive material to light emitted from a light source and processes the photosensitive material with processing solution, the printer processor having a function to correct exposure conditions in response to at least the amount of light from the light source, characteristics of the photosensitive material, and a state of the processing solution by adjusting values of a plurality of parameters for exposure condition corrections, comprising the steps of:

(a) storing a history of change of a value of at least one parameter of the plurality of parameters; and (b) determining whether or not the state of the processing solution is preferable based on the stored history of change of the value of parameter of at least one parameter of the plurality of parameters.

In a second aspect of the present invention, at least one parameter of the plurality of parameters in the first aspect is a photosensitive material correction parameter for correcting the exposure conditions in response to the characteristics of the photosensitive material.

In a third aspect of the present invention, at least one parameter of the plurality of parameters in the first aspect is a predetermined master correction parameter, and the printer processor in the first aspect adjusts values of parameters of the plurality of parameters corresponding to the amount of light from the light source and the characteristics of the photosensitive material, and also adjusts the value of the master correction parameter in response to a change in the processing solution state, and later performs the step (a) described above.

A fourth aspect of the present invention is a printer processor which performs exposure of a photosensitive material to a light emitted from a light source in order to record an image thereon and processing of the photosensitive material with processing solution in a processing section, and which effects correction of an exposure condition in response to at least one of amount of light from the light source and characteristics of the photosensitive material, another exposure of the photosensitive material to record a predetermined test image and processing of the photosensitive material on which the predetermined test image has been recorded with the processing solution, and measurement of density of the test image which has been recorded on the processed photosensitive material, the printer processor having a function to adjust a predetermined master correction parameter value for exposure condition correction so that the measured density of the test image falls within a predetermined range, comprising:

history-of-change storing means for storing a history of change of the master correction parameter value; and processing solution state determining means for determining whether or not the processing solution is in preferable state based on the history of change of the master correction parameter value stored by the history-of-change storing means.

A fifth aspect of the present invention is composed so that the processing solution state determining means in the fourth aspect is constituted so as to determine whether or not the processing solution is in the preferable state based on one of a change rate and a change amount of the master correction parameter value adjusted latest to the master correction parameter value which was adjusted before the latest adjustment, and on one of a change rate and a change amount of the master correction parameter value adjusted latest to one of an average value of a plurality of the master correction parameter values which were adjusted during a predetermined period before the latest adjustment and an average value of the master parameter values which were adjusted before the latest adjustment for a predetermined number of times.

In a sixth aspect of the present invention, the master correction parameter value in the fifth aspect which was adjusted before the latest adjustment is at least one of the master correction parameter value which was adjusted for the first time after replenishment of replenishing solution into the processing section or exchange of the processing solution in the processing section, and the master correction parameter value which was adjusted at the time immediately before the latest adjustment.

In a seventh aspect of the present invention, the printer processor in any one of the fourth to the sixth aspect of the present invention further comprises prohibition means for prohibiting adjustment of the value of the master correction parameter before correction of the exposure condition is effected in response to the characteristics of a photosensitive material which has been newly loaded on the printer processor.

In an eighth aspect of the present invention, the printer processor in any one of the fourth to the seventh aspect of the present invention automatically corrects the exposure conditions in response to the amount of light upon activation of the processor, and adjusts the value of the master correction parameter in response to a change in the state of the processing solution.

In the first aspect of the present invention described above, the exposure conditions are corrected by adjusting values of a plurality of exposure condition correction parameter in response to at least the amount of light from the light source, the characteristics of the photosensitive material, and the change in the state of the processing solution. The history of change of the value of the at least one parameter of the plurality of parameters is stored, and the processing solution is determined whether or not it is in the preferable state based on the history of change of the value of the at least one parameter of the plurality of parameters.

The exposure conditions are affected greatly by three parameters, namely, the amount of light from a light source, characteristics of a photosensitive material, and a change in the processing solution state. Among these, the amount of light from a light source tends to change randomly. The characteristics of the photosensitive material may temporarily change greatly when the photosensitive materials are exchanged, that is, when a photosensitive material is newly loaded on the printer processor, while it does not change greatly otherwise. On the other hand, the state of the processing solution changes in a gradually-changing manner. The processing solution thus has the characteristics that the state thereof changes gradually with time, unlike the amount of light from the light source and the characteristics of the photosensitive material.

Therefore, a change in the characteristics of the processing solution state appears in the history of change of the value of the exposure condition correction parameter. In other words, the processing solution can be determined whether or not it is in the preferable condition on the basis of the history of change of the value of the exposure condition correction parameter relating to the processing solution state.

As described in the second aspect of the present invention, one parameter of the plurality of the correction parameters is the photosensitive material correction parameter for correcting the exposure conditions in response to the characteristics of the photosensitive material. The processing solution state can be determined more accurately, since the processing solution is determined whether or not it is in the preferable condition based on the value of the photosensitive material correction parameter and the history of change thereof.

In the third aspect of the present invention, the exposure conditions are corrected in response to the at least one of the amount of light from the light source and the characteristics of the photosensitive material. The value of the predetermined master correction parameter, or the value of the predetermined processing solution correction parameter, is then adjusted in response to the change in the processing solution state. The history of change of the value of the master correction parameter is stored and, based on the history of change of the value of the master correction parameter, the processing solution can be determined whether or not it is in a preferable state.

More specifically, as does the printer processor in the fourth aspect, the exposure conditions are corrected in response to a detected amount of light from the light source or the characteristics of the photosensitive material. A predetermined test image is then recorded on the photosensitive material which is processed with the processing solution, and a density of the test image which has been recorded on the processed photosensitive material is measured. The value of the master correction parameter for exposure conditions is adjusted so that the measured density is in a predetermined range (target density). The history-of-change storing means stores the history of change of the value of the master correction parameter, and the processing solution state determining means determines whether or not the processing solution is in the preferable state based on the stored history of change of the master correction parameter.

The processing solution state determining means can determine, as does in the fifth aspect, whether or not the processing solution is in the preferable state based on one of the change rate and the change amount of the master correction parameter value adjusted latest to the master correction parameter value which was adjusted before the latest adjustment, and on one of the change rate and the change amount of the master correction parameter value adjusted latest relative to an average value of a plurality of the master correction parameter values which were adjusted during the predetermined period before the latest adjustment and the average value of the master parameter values which were adjusted before the latest adjustment for the predetermined number of times.

As the value of the master correction parameter which was ajusted in the past, at least one of the value of the master correction parameter which was adjusted for the first time after replenishment of replenisher or fresh processing solution into the processing section or exchange of the processing solution, and the value of master correction parameter which was adjusted immediately before the latest adjustment can be used as in the sixth aspect of the present invention.

For example, the processing solution is determined whether or not it is in the preferable state based on three comparison results which are the comparison between the value of the master correction parameter adjusted latest and the value of the master correction parameter which was adjusted for the first time after replenishment of replenisher or exchange of the processing solution (hereafter called reference master correction parameter) (a first comparison process), the comparison between the value of the master correction parameter adjusted latest and the master correction parameter adjusted immediately before the latest adjustment (second comparison process), and the comparison between the value of the latest master correction parameter and an average value of the master correction parameter values in 10 previous adjustments (a third comparison process).

As will be described later, for example, the result of the first comparison process (the change amount) suggests the difference between the value of the master correction parameter adjusted latest and the value of the master correction parameter of the processing solution which has just replenished with replenisher or water, or which has just exchanged. The second comparison process result can detect a sudden change in the processing solution state. Ordinarily, the second comparison process result is in a certain fluctuation range. If the fluctuation or change is large, its cause will be limited to contamination of the processing solution, for example, by an earthquake or a malfunctioning of a part or parts used in a densitometer or a photometric system. The third comparison result suggests a trend of recent change in the processing solution state.

For example, FIG. 14 shows a history of change in the value of the master correction parameter (shown as "master balance" in FIG. 14) in a case where an amount of replenishment water is less than the amount of water which has evaporated from the processing solution.

This master balance is the correction parameter for correcting the exposure conditions in response to mainly a change in the processing solution state, and is initially set to "500" when the printer processor is shipped from a factory.

In FIGS. 10–21, graphs of the master balance or the history of change of the above-described first to third comparison process results regarding the master balance are shown. In each graph, the horizontal axis means the days when the first to third comparison processes are carried out (processing day), and the number on the axis shows the days elapsed from the process starting day. The master balance is shown for each color component namely cyan, magenta, and yellow. "C", "M", and "Y" in legends in FIGS. 10–21 respectively represents the color component of cyan, magenta, and yellow.

By changing the master balance, exposure amount can be adjusted. Specifically, the exposure amount is adjusted for each color by adjusting insertion amount of light-adjusting filters for each color (C, M, and Y) into a light path. When the value of the master balance decreases for one color, exposure amount is also reduced, because the insertion amount of the light-adjusting filter corresponding to the color is increased, which leads to reduction in transparency or transmission of the light from the light source proportionally to the reduction of the master balance value. For example, in a series of operations called "printing condition maintenance", a predetermined test image is recorded on a photosensitive material. The exposed photosensitive material is then processed, and density of the test image which has been recorded on the processed photosensitive material is then measured. If the measured density becomes higher than a predetermined target density due to a change in a processing solution state or the like, the value of the master balance is adjusted to maintain the target density by appropriately inserting the light-adjusting filter so that the amount of light is reduced. In other words, the master balance value is calculated to be smaller so that the amount of light is reduced.

The relationship between the magnitude of the master balance value and the change amount in exposure amount, or the relationship between the magnitude of the master balance value and the change amount in density of an image can be designed arbitrarily. However, it is preferable to design the change amount in the density and the change amount in the master balance value so that they have a linear relationship. In the present example, the exposure conditions (insertion of the light-adjusting filters) has been designed so that the print density reduces by "0.01" when the master balance value increases by "1".

The density (D) measured by the densitometer is shown by $D = -\log T$, with T being the transparency or trasmission amount of light when an image is exposed to the light. The print density is a logarithm density calculated in the same manner with a reflection amount of the light substituting the transparency or transmission amount of the light. For example, if the reflection amount is 1% (T=0.01), the density of the image is 2.00. If the reflection amount is 10%, the density of the image is 1.00.

As shown by the graph in FIG. 14, if the amount of the replenishment water is less than the amount of water which has evaporated from the processing solution, the master balance value tends to reduce gradually. In this case, the difference by the first comparison processing between the master correction parameter value and the reference master correction parameter value changes as shown by the graph in FIG. 15. The difference by the second comparison process between the latest master correction parameter value and the master correction parameter value measured one day prior to the latest measurement changes as shown by the graph in FIG. 16. The difference by the third comparison process between the master correction parameter value and the average value of the master correction parameter values in the past 10 days changes as shown by the graph in FIG. 17.

The difference between the latest master correction parameter value and the master correction parameter value measured one day prior to the latest measurement shown by FIG. 16 does not change greatly. However, from the graph in FIG. 17, the difference between the master correction parameter value and the average value of the master correction parameter values in the past 10 days shows a slight reduction. Moreover, the difference between the master correction parameter value and the reference master correction parameter value shows an obvious reduction trend in the graph in FIG. 15. Therefore, it is inferred that the cause is not a factor which occurs suddenly (for example, contamination or the like), but a factor which changes gradually, for example a malfunctioning of an evaporation correction system like this case (insufficient water refill) or excess replenishment.

As described above, according to each aspect, an operator of the printer processor can promptly detect the state of the processing solution without confirmation of the processing solution performance or state through the complex procedure using the above-stated conventional control strip. Furthermore, the operator can take appropriate countermeasures, since a change trend of the processing solution performance or state can be monitored, which leads to easier identification of the cause in the case of a deterioration or degradation of the processing solution state.

Moreover, in the printer processor as in the seventh aspect of the present invention, it is avoidable to adjust the master correction parameter value by mistake after loading of a new photosensitive material without considering a difference in characteristics of the photosensitive material which has been newly loaded on the printer processor and that of the previously loaded material by having the prohibition means for prohibiting adjustment of the master correction parameter value before the exposure conditions are corrected in response to the characteristics of the photosensitive material which has been newly loaded on the printer processor. In other words, by controlling the exposure conditions on the basis of on the characteristics of the newly loaded photosensitive material so that the difference in characteristics between the newly loaded paper and the previous loaded paper is not included in the adjusted value of the master correction parameter, the characteristics of the photosensitive material to be processed does not affect the determination of the processing solution state on the basis of the change in the master correction parameter value, and determining accuracy of the processing solution state is maintained at a high level.

On the other hand, as described as the eighth aspect of the present invention, it is preferable to first adjust the exposure conditions in response to the detected amount of exposure light automatically at the beginning of operation, and then to adjust the master correction parameter value in response to a change in the processing solution state. By automatically adjusting the master correction parameter value in response to the change in the processing solution state at the beginning of the operation, daily processing solution performance confirmation process using the control strip is not abolished, and daily work load can be reduced.

The printer processor of the present invention can be applicable to both a printer processor which exposes a paper to record a film image thereon and processes it with a processing solution, and a printer processor which exposes a paper to record a digital image information using a laser beam or a monitor image and processes it with a processing solution.

A ninth aspect of the present invention is a method to determine a state of a processing solution in a processor which processes a photosensitive material with processing solution, comprising the steps of:

adjusting a predetermined processing solution state determining parameter value in response to a change in the processing solution state;

storing a history of change of the processing solution state determining parameter value; and determining whether or not the processing solution is in a preferable state based on the history of change of the processing solution state determining parameter value.

A tenth aspect of the present invention is a printer processor comprising:

an exposing device for exposing a photosensitive material to a light emitted from a light source for recording an image thereon;

a processing solution processing section for processing the photosensitive material on which the image has been recorded with processing solution;

an exposure condition correcting means for correcting an exposure condition in response to at least the amount of light from the light source, characteristics of the photosensitive material, and a change in the processing solution state, by adjusting values of a plurality of exposure condition correction parameters values; and a memory for storing a value of a processing solution correction parameter for correcting the exposure condition in response to the change in the processing solution state, as a value of one parameter of the plurality of correction parameters.

In an eleventh aspect of the present invention, the memory of the tenth aspect of the present invention is composed so that it stores a history of change of the value of the processing solution state correction parameter, and further comprises a processing solution state determining means for determining whether or not the processing solution is in a preferable state based on the history of change of the value of the processing solution state correction parameter stored in the memory.

In a twelfth aspect of the present invention, the processing solution state determining means in the eleventh aspect is composed so that it determines whether or not the processing solution is in a preferable state based on either a change rate or a change amount of the processing solution correction parameter value adjusted latest to the processing solution correction parameter value which was adjusted before the latest adjustment, and on either a change rate or a change amount of the processing solution correction parameter value adjusted latest relative to an average value of a plurality of the processing solution correction parameter values which were adjusted during a predetermined period before the latest adjustment and to an average value of the processing solution parameter values which were adjusted before the latest adjustment for a predetermined number of times.

In a thirteenth aspect of the present invention, the value of the processing solution correction parameter in the twelfth aspect which was adjusted before the latest adjustment is
at least one of the processing solution correction parameter value which was adjusted for the first time after the rephenishment of replenisher in the processing section, or the exchange of used solution for fresh one and the processing solution correction parameter value adjusted immediately before the latest adjustment.

A fourteenth aspect of the present invention is any one of the tenth to thirteenth aspect of the present invention which further comprises a prohibition means for prohibiting that the processing solution correction parameter value is adjusted before the exposure condition is corrected in response to the characteristics of the photosensitive material which has been newly loaded on the printer processor.

In a fifteenth aspect of the present invention, the exposure condition is automatically corrected in response to the amount of light detected at the beginning of the operation and then the value of the processing solution correction parameter is automatically adjusted in response to the change in the processing solution state by any one of the printer processors described in the tenth to fourteenth aspects of the present invention.

The printer processor in the ninth aspect adjusts the predetermined processing solution state determining parameter value in response to the change in the processing solution state. As this processing solution state determining parameter, the exposure correction parameter for correcting the exposure condition in response to the change in the processing solution state, or any parameter for detecting the change in the processing solution state and setting the processing solution state in response to the change regardless of the exposure condition correction can be used. The history of change of the value of the processing solution state determining parameter is stored and the processing solution is determined whether or not it is in the preferable state based on the history of change.

The printer processor in the tenth aspect can be listed as the processor which can determine the state of the processing solution appropriately using the exposure condition correction parameter as the processing solution state determining parameter. However, the processor in the ninth aspect is not limited to printer processors, and it is applicable to a processor which does not have a function as a printer.

The printer processor in the tenth aspect corrects the exposure conditions in response to at least the amount of light, the characteristics of the photosensitive material, and the change in the processing solution state by adjusting values of the plurality of exposure condition correction parameters. Moreover, the printer processor has the memory to store the value of the processing solution correction parameter value for correcting the exposure conditions in response to the change in the processing solution state, as one parameter of the correction parameters.

As described above, in the ninth to fifteenth aspects of the present invention, an operator of the printer processor can promptly detect the state of the processing solution without performing a complex process of processing solution performance confirmation using the conventional control strip. Furthermore, since the change trend of the processing solution performance or state can be monitored, in the case where the processing solution state is deteriorated or degradated, causes of the deterioration can be specified more easily based on the change trend, and the operator can take appropriate measures. Moreover, since the processing solution correction parameter is used as an exclusive correction parameter for the change in the processing solution state, in the case where a sudden or intentional disturbance occurred in the exposure control performed by the printer processor, the effects of the disturbance can be corrected using the correction parameters other than the processing solution correction parameter. In other words, even when the sudden or intentional disturbance occurred, ditermination of the processing solution state based on the history of change of the processing solution correction parameter value can be carried out continuously.

BRIEF DESCRIPTION OF THE DRAWINGS

FIG. 4 shows a paper exposed to a plurality of exposure conditions.

FIG. 5 is a flow chart showing a main routine in the first embodiment.

FIG. 20 is a graph showing a temporal change in difference between a latest master balance and a master balance one day prior to the latest in event 3.

FIG. 21 is a graph showing a temporal change in difference between a master balance and an averaged master balance in event 3.

FIG. 22A is a table showing a density measurement result after contamination occurred in event 1.

FIG. 22B is a table showing density differences between a control strip processing result and a result after the contamination in event 1.

FIG. 23A is a table showing a density measurement result before the contamination occurs in event 1.

FIG. 23B is a table showing density differences between a control strip processing result and a result before the contamination in event 1.

FIG. 24 is a table showing differences in master balance and in LD density before and after the contamination in event 1.

FIG. 25 is a table showing temporal changes in LD density and master balance differences in event 2.

DESCRIPTION OF THE PREFERRED EMBODIMENTS

Figure 1:
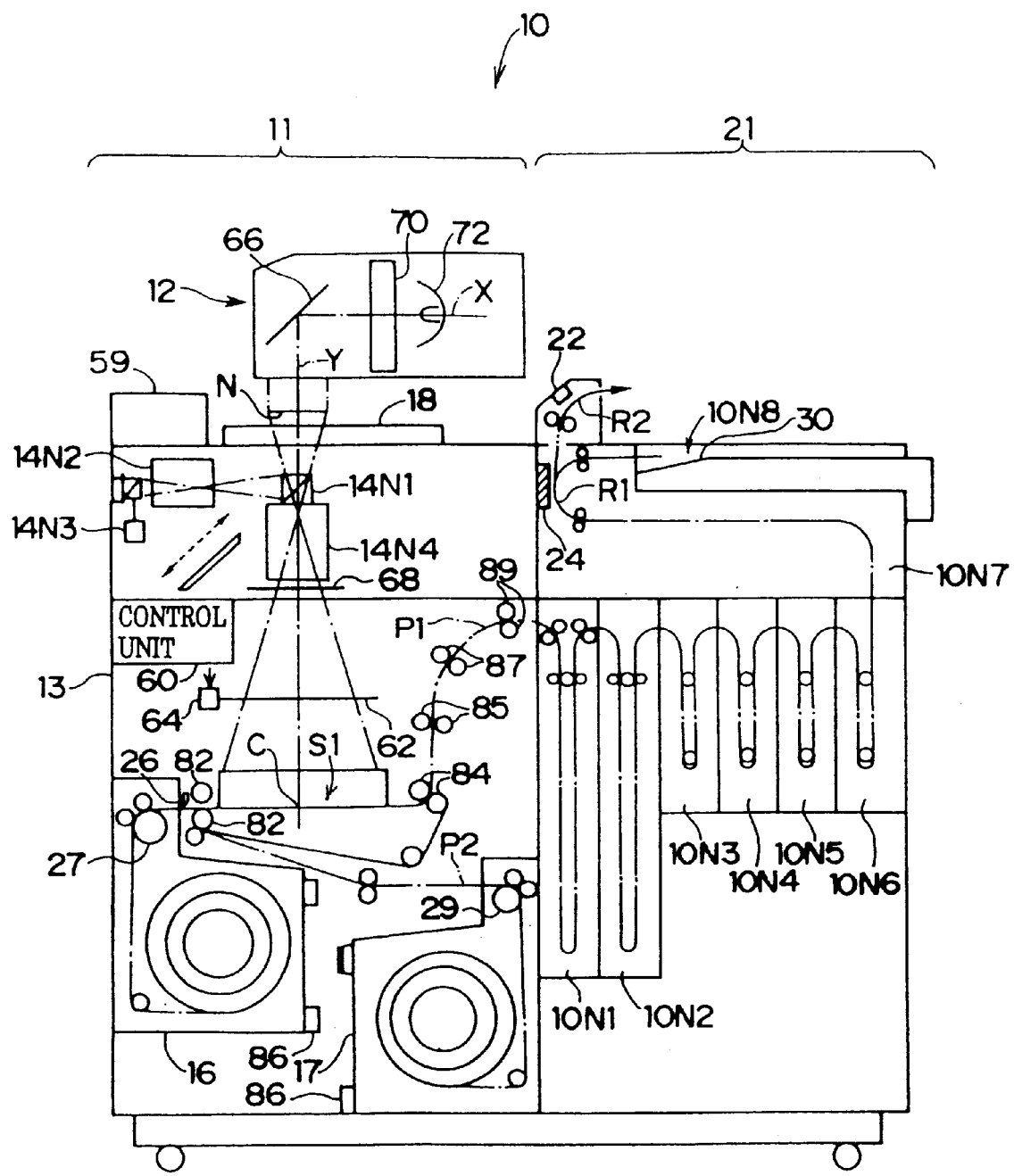
FIG. 1 shows a schematic configuration of the printer processor in a first embodiment.

Hereafter, a first embodiment of the present invention will be explained referring to the accompanying figures. A configuration of the first embodiment is explained first. As shown by FIG. 1, a printer processor 10 related to the present invention comprises an exposing section 11 for exposing papers for color printing P1 or P2 as photosensitive material or photographic printing paper to record an image of a negative film N thereon, and a processing section 21 for performing development, fixing, rinsing and drying processes on the exposed paper P1 or P2.

In the lower most part of the printer processor 11, a paper magazine 16 where the paper P1 is rolled and stored and a paper magazine 17 where the paper P2 is rolled and stored are placed. On each side of the paper magazines 16 and 17, a paper magazine identification information (hereafter called paper magazine ID) to show a kind of the stored paper P1 or P2 (a kind determined by width, length, and a kind of surface of the paper) is recorded as a bar code which is not shown in FIG. 1. A bar code reader 86 for reading information of each paper magazine expressed as the bar code is placed corresponding to the bar code reading unit of the paper magazine 16 or 17. In the vicinity of a supplying opening of a paper magazine, a cutter 26 for cutting the paper P1 or P2 in a predetermined size or in image frame unit is placed.

On the other hand, in the uppermost part of the printer processor 11, a light source unit 12 for emitting an exposure light in a predetermined direction is placed. In the light source 12, a halogen lamp 72 is placed as a light source for exposure. In a path of the exposure light emitted from the halogen lamp 72, light adjusting filters 70 comprising filters for cyan, magenta and yellow colors, and a reflection mirror 66 for changing the direction of the exposure light are placed.

In FIG. 1, a negative film carrier 18 for positioning a negative film N at a predetermined printing position is placed in the reflection direction of the exposure light from the reflection mirror 66. A projection lens 14N4 for projecting an image recorded on the negative film N on a paper exposure stage S1 in various magnification is placed under the negative film carrier 18.

Over the projection lens 14N4, a movable reflection mirror 14N1 for total reflection of the incident exposure light coming in the projection lens 14N4 is placed. In the reflection direction of the exposure light from the reflection mirror 14N1 (in the left of FIG. 1), a lens 14N2 and a scanner 14N3 composed of an image sensor and the like are placed. The scanner 14N3 was inspected in advance upon shipment from a factory, and measurement by the scanner 14N3 is accurate.

Under the projection lens 14N4, a condition maintenance filter 68, a black shutter 62 for shielding the exposure light emitted on the paper P1, and a black shutter driving device 64 for opening/closing the black shutter 62 are placed. The black shutter driving device 64 is connected to a later-described control unit 60.

Figure 2:
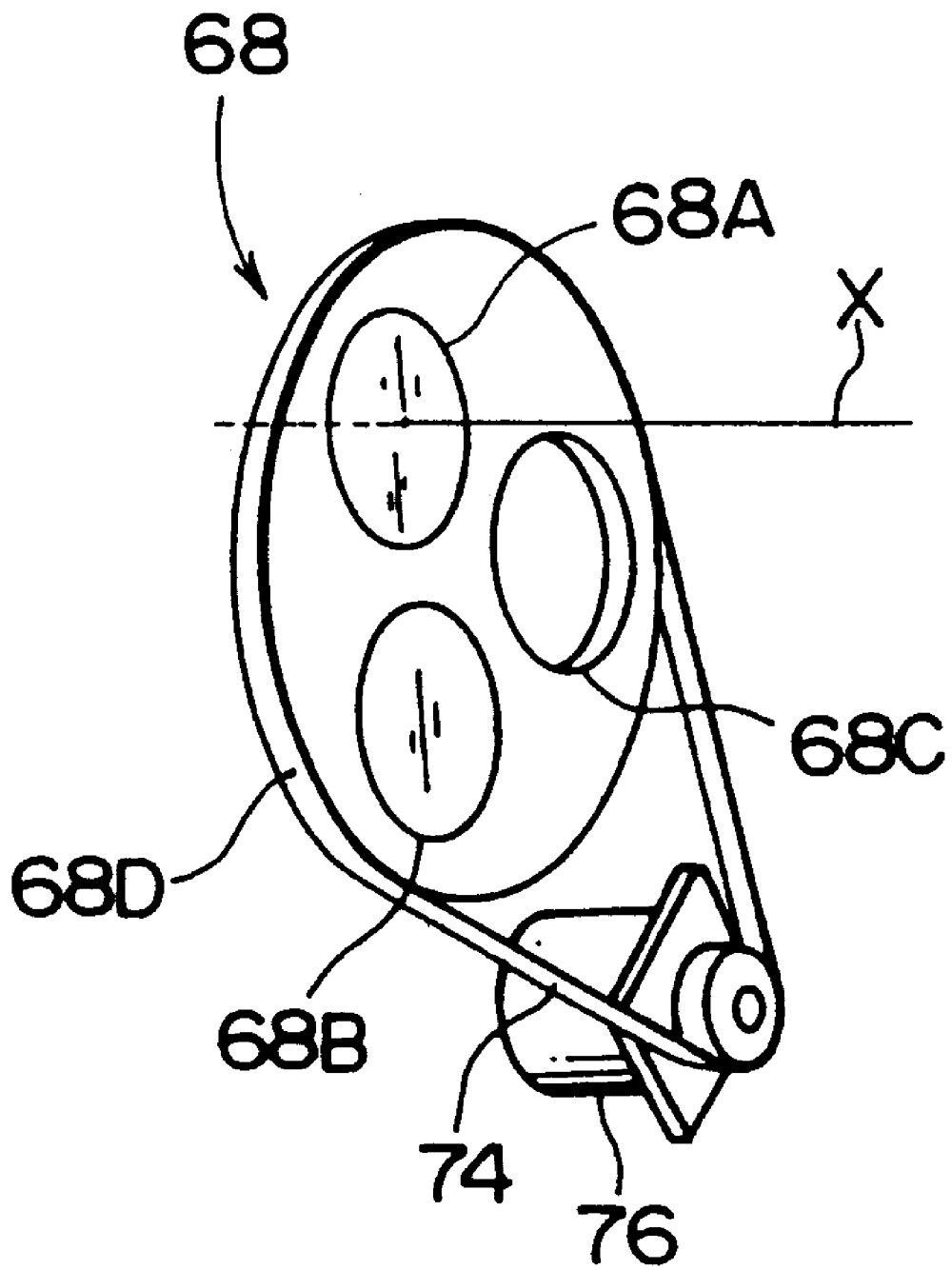
FIG. 2 is shows a schematic configuration of an ND filter.

In the condition maintenance filter 68, a disc-like base plate 68D in a large diameter is placed as shown by FIG. 2. In the base plate 68D, a disc-like $D_{max}$ ND filter 68A in a small diameter, a medium density ND filter 68B, and a circular hole 68C for an ordinary printing are placed. Each ND filter is a neutral gray filter without color adjusting property and equally absorbs any wave-length light. The density of the $D_{max}$ ND filter 68A is less than that of the medium density ND filter. By using the $D_{max}$ ND filter 68A, a highest density part (an exposed area A1 described later in FIG. 4) can be obtained, while a neutral gray part (an exposed area A2 in FIG. 4) can be obtained by using the medium density ND filter 68B. An unexposed part (unexposed area A3 in FIG. 4) can be obtained by not performing exposure.

A belt 74 rolls around the side of the base plate 68D in one end, and the other end of the belt 74 rolls around a filter driving device 76 composed of a motor and the like. The central axis of the base 68D is placed at a position deviating from a light axis X so that the $D_{max}$ ND filter 68A, the medium density ND filter 68B, and the circular hole 68C cross in this order in turn the exposure light path centered at the light axis X when the base plate 68D rotates by a driving force from the filter driving device 76. The highest density part may be obtained by exposure using the circular hole 68C. In that case, the $D_{max}$ ND filter 68A is not necessary, and the highest density part, neutral gray part, and the unexposed part can be obtained by using only the medium density ND filter 68B and the circular hole 68C.

Two pairs of rollers 82 and 84 which convey the paper P1 are placed so that the exposure stage S1 is placed therebetween. These pairs of rollers 82 and 84 are driven by a paper conveying device 80 (see FIG. 3). In the advancing direction of the paper passing the roller pair 84, other pairs of rollers 85, 87, and 89 to convey the paper to the processing unit 21 are placed in this order along the paper conveyance path.

In the processing unit 21, a color development process tub 10N1, a bleach-fixing process tub 10N2, rinse process tubs 10N3–10N6, a drying unit 10N7 and a sorterunit 10N8 are placed. A color development processing solution, a bleach-fixing processing solution, and rinsing liquids (washing processing solutions) are respectively stored in the color development processing tank or vessel 10N1, the bleach-fixing process tank 10N2, and rinse processing tanks 10N3–10N6. The paper developed by the color development process tank 10N1 is bleached and fixed by the bleach-fixing tank 10N2, and then rinsed by the rinse processing tanks 10N3–10N6, and finally dried by the drying section 10N7.

In the sorter unit 10N8, a tray 30 is placed to temporarily store the papers after the drying process cut in an image frame unit.

In the processing section 21, a diverging route R2 which diverges from a paper conveying route R1 to convey finished print to the sorter unit 10N8, and a switching device 24 for switching the route along which the print is conveyed from R1 to the diverging route R2 are placed. Along the diverging route R2, a densitometer 22 to measure the density of the print is placed. Within this densitometer, a light source and three photo sensors including color filters for C, M, and Y to respectively detect the amount of each color light reflected from the photosensitive material are built in.

On a body 13 of the printer processor 10, an operating unit 59 which comprises a later-described display 58 (see FIG. 3) and a keyboard 56 is placed.

Figure 3:
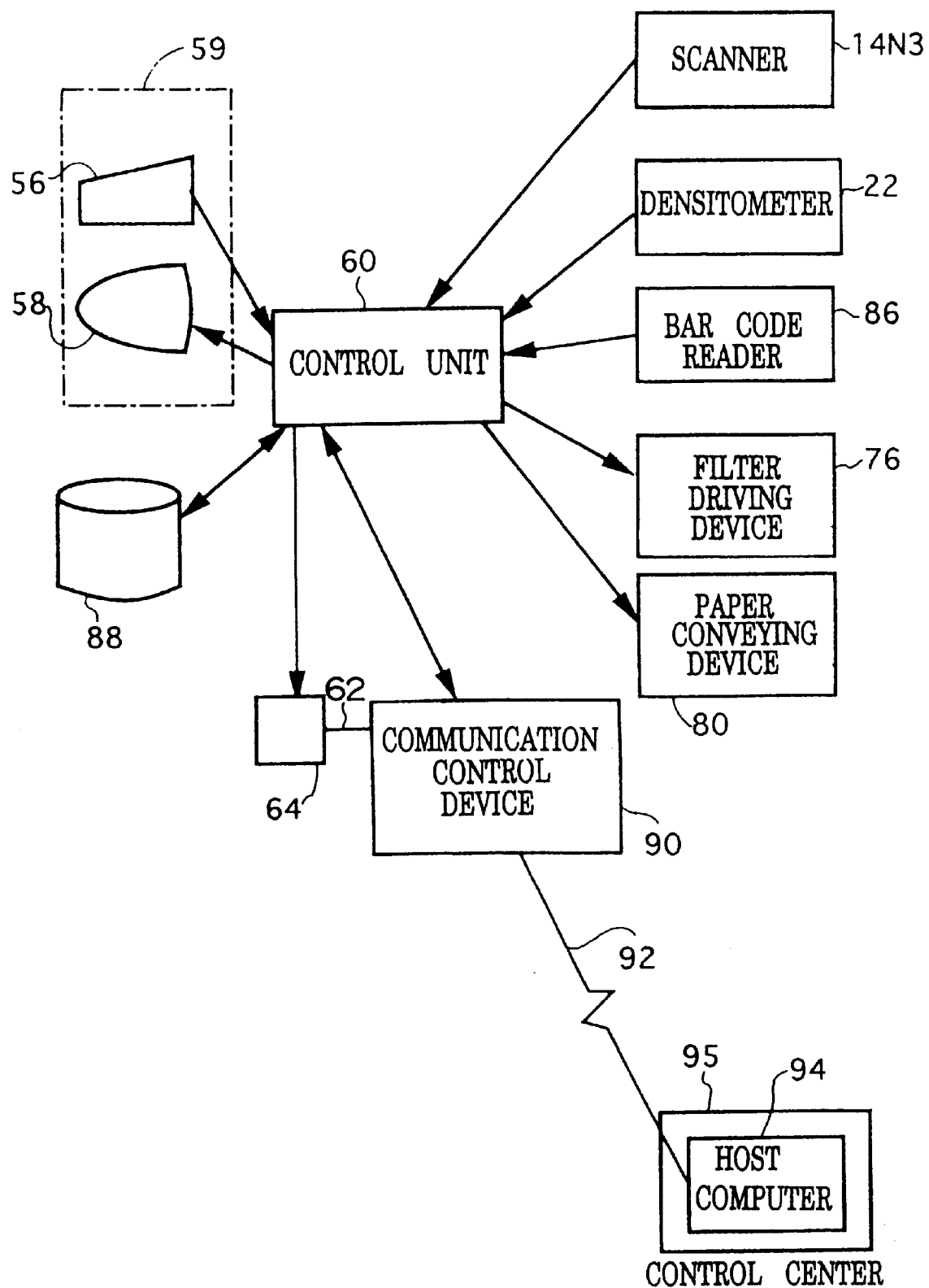
FIG. 3 is a block diagram showing a configuration of a device related to processing solution control.

Also in the printer processor 10, the control unit 60 which is a device for performing the entire processing solution control is placed. The control unit 60 comprises a microcomputer which is composed of a CPU, a RAM, a ROM, an input/output port, and the like (not shown). As shown by FIG. 3, the keyboard 56 and the display 58 which compose the operating unit 59 are connected to the control unit 60. Therefore, it is possible that an operator inputs information and a command via the keyboard 56, and a message to warn an operator that the processing solution should be changed or the like is displayed on the display 58. Moreover, the scanner 14N3, the densitometer 22, the bar code reader 86, the filter driving device 76, the paper conveying device 80, and the black shutter driving device 64 are connected to the control unit 60.

The control unit 60 also has a connection to a storage device 88 composed of a magnetic disc device, an optical disc device which can read or write, a semiconductor memory, and the like. It is possible to store in the storage device 88 a variety of information such as information regarding the judgment result of the processing solution state. Furthermore, the control unit 60 is connected via a communication control device 90 to a host computer 94 in a control center 95 which manages information regarding maintenance, malfunctioning, and the like of printer processors placed in various places. Therefore, it is possible to send information regarding an abnormal state of the processing solution (for example, information regarding a history of change of the master balance) from the control unit 60 to the host computer 94.

Moreover, the control unit 60 has a function to detect remains of the papers P1 and P2 which are respectively stored in the paper magazines 16 and 17. The remains can be detected by, for example, how much conveying rollers 27 or 29 placed respectively in the paper magazines 16 and 17 have rotated. By placing an infrared sensor comprising an infrared light emitting diode and a photo receptor in the paper conveying path for P1 to detect presence of the paper P1, the remains of the paper P1 may be detected based on conveying speed of the paper and a time needed by the paper P1 to pass through the infrared sensor.

An operation of the present embodiment will be described next. At the beginning of the daily operation, a power switch (not shown) of the printer processor is switched on. After a predetermined time elapses, heat-up for raising the temperature of the processing solution to a predetermined temperature is automatically activated. After the heat-up is finished with the temperature of the processing solution having reached to the predetermined temperature, a control routine shown by FIG. 5 is automatically performed by the control unit 60.

On the other hand, detection of the remains of the paper P to be exposed is carried out in parallel to a printing process or the like. More specifically, an interrupting routine shown by FIG. 9 is performed at the timing when the exposed paper P is cut by the cutter 26.

The interrupting routine shown by FIG. 9 will now be explained below. In step 192 in FIG. 9, the bar code reader 86 reads the ID of the paper magazine in which the paper P to be detected is stored (for example, the paper magazine 16). In the next step 194, the remains of the paper P in, for example, the paper magazine 16 is detected by how much the conveying roller 27 in the paper magazine 16 has rotated. In the following step 196, the remains of the paper P are determined if it is "0" or not. Only when the remains of the paper P are determined to be 0, the procedure goes to step 198 and returns to the start, setting a flag corresponding to the ID of the paper magazine in which the paper P is stored to "1".

Figure 9:
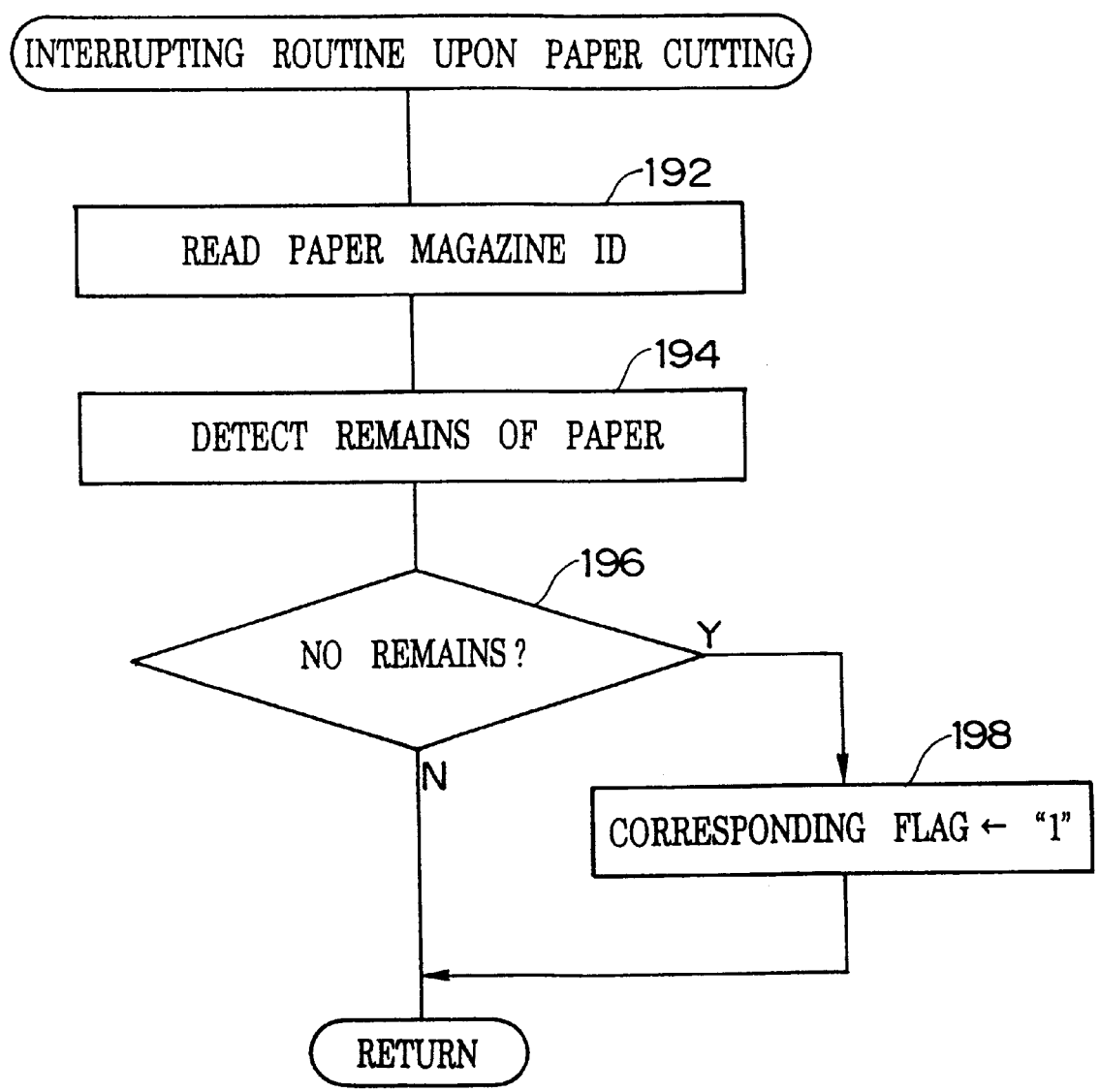
FIG. 9 is a flow chart showing an interrupting process routine performed when a paper is cut.

By the above-described interrupting routine in FIG. 9, it is detected that the remains of the paper has become 0, and the flag corresponding to the ID of the paper magazine in which the paper P is stored is set to "1".

When the flag corresponding to the paper magazine ID of the paper magazine 16 is 1, a command to perform the printing condition maintenance using the paper P stored in the paper magazine 16 is not accepted. A message to warn an operator that a later-described automatic paper condition setting for the paper P should be carried out first is displayed on the display 58.

The control routine shown by FIG. 5 will now be explained.

In step 102 in FIG. 5, a light source correction is carried out as follows. First, a predetermined voltage is supplied to the halogen lamp 72 with no negative film being set in the negative film carrier 18, while the reflection mirror 14N1 is moved to a position where the exposure light is totally reflected. The light-adjusting filters 70 are moved to predetermined positions, and the amount of light is measured by the scanner 14N3 to be compared with the amount of light measured last time. Based on the comparison result, the light source voltage and the positions of the color adjusting filters 70 are adjusted so that a predetermined amount of light maintaining a predetermined color balance can be obtained.

By this procedure, change in conditions due to uncleanness, degrading or the like of the light source 12 such as the light-adjusting filters 70 and the halogen lamp 72 is eliminated, and the predetermined amount of light can be obtained.

Figure 6:
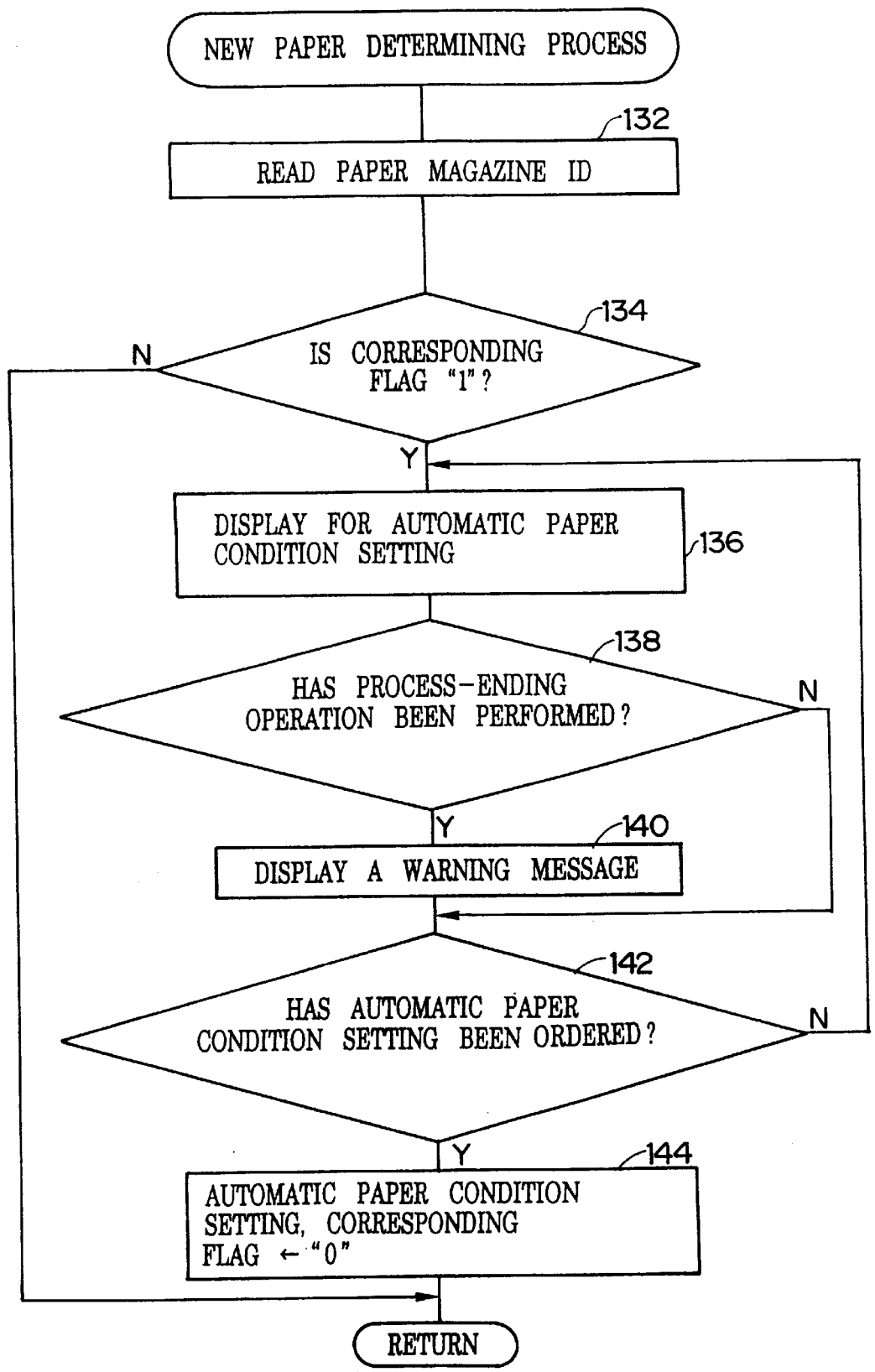
FIG. 6 is a flow chart showing a subroutine of new paper determining process.

In the following step 104, a new paper determining process described in detail by FIG. 6 is carried out. First the ID of the paper magazine which stores the paper P to be exposed (for example, paper magazine 16) is read by the bar code reader 86 (step 132), and it is determined whether or not the flag corresponding to the paper magazine ID is 1 at this stage (step 134). If the flag is not 1, the paper to be exposed is determined not to be a new paper, and the routine returns to the main routine.

On the other hand, if the flag is 1 in the step 134, the paper to be exposed is determined to be a new paper. In this case, it is possible that there are much differences in characteristics between the newly loaded paper and the previous paper. Therefore, a message such as "Perform the automatic paper condition setting" is displayed on the display 58 (step 136). After this step, the procedure stands by until the operator carries out the automatic paper condition setting. During this stand-by state, if the operator performs an end-of-printing operation and tries to switch off the printer processor, a warning message such as "Be sure to perform the automatic paper condition setting before power shut down, otherwise the light source correction and the printing condition maintenance will not be carried out automatically when switched on in the next operation" is displayed on the display 58 (step 140).

After the operator carries out the automatic paper condition setting (determined Y in step 142), the procedure goes on to step 144, and the automatic paper condition setting as before is carried out. This automatic paper condition setting is carried out in, for example, a later-described control routine shown by FIG. 26. By this automatic paper condition setting, a paper balance corresponding to the paper magazine ID (a correction parameter for setting the exposure condition correction parameter to compensate for the characteristics of the newly loaded paper P) is updated. In the step 144, the flag corresponding to the paper magazine ID is set to 0, and the procedure returns to the main routine in FIG. 5.

Figure 7:
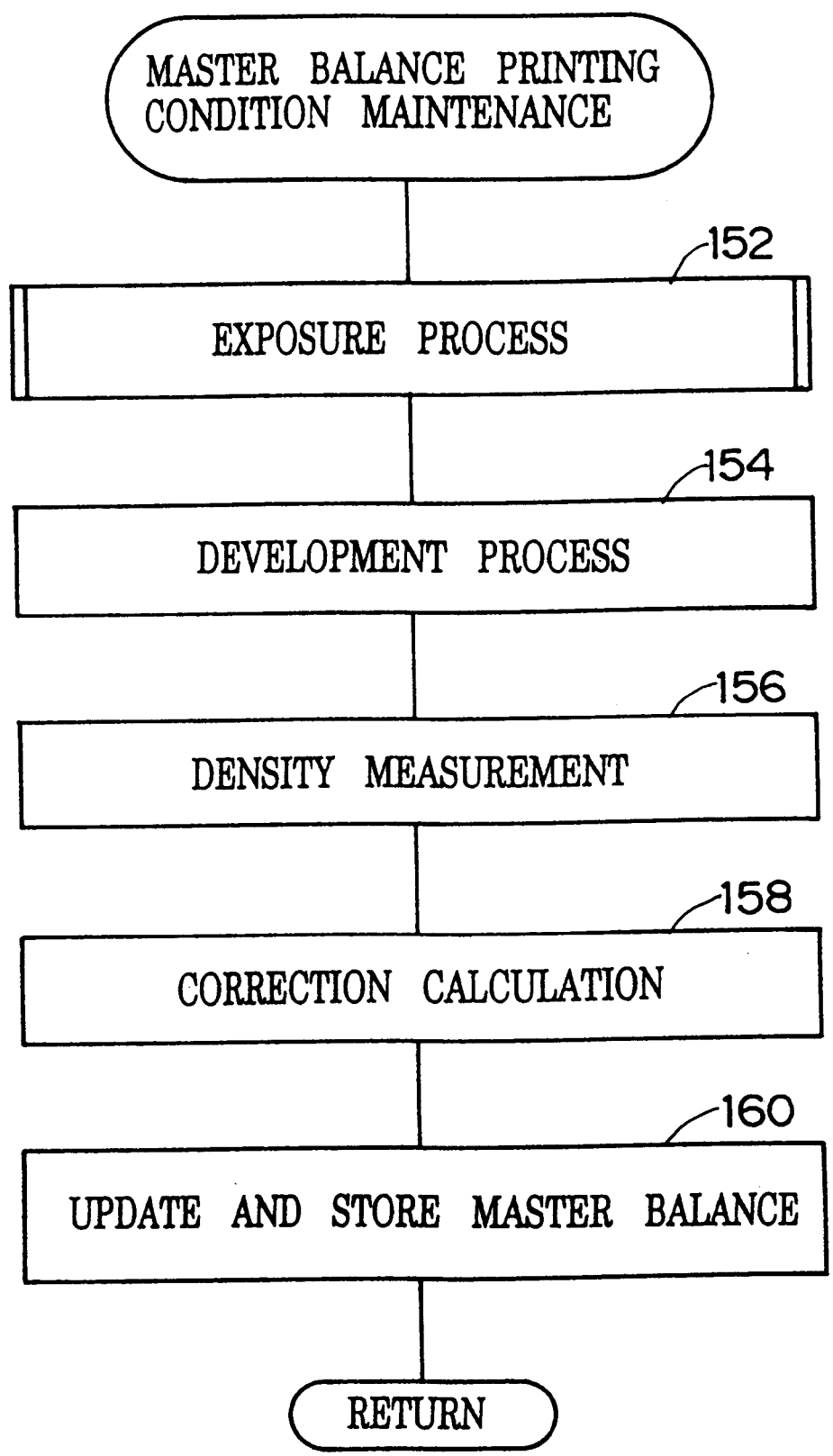
FIG. 7 is a flow chart showing a subroutine of master balance printing condition maintenance.
Figure 8:
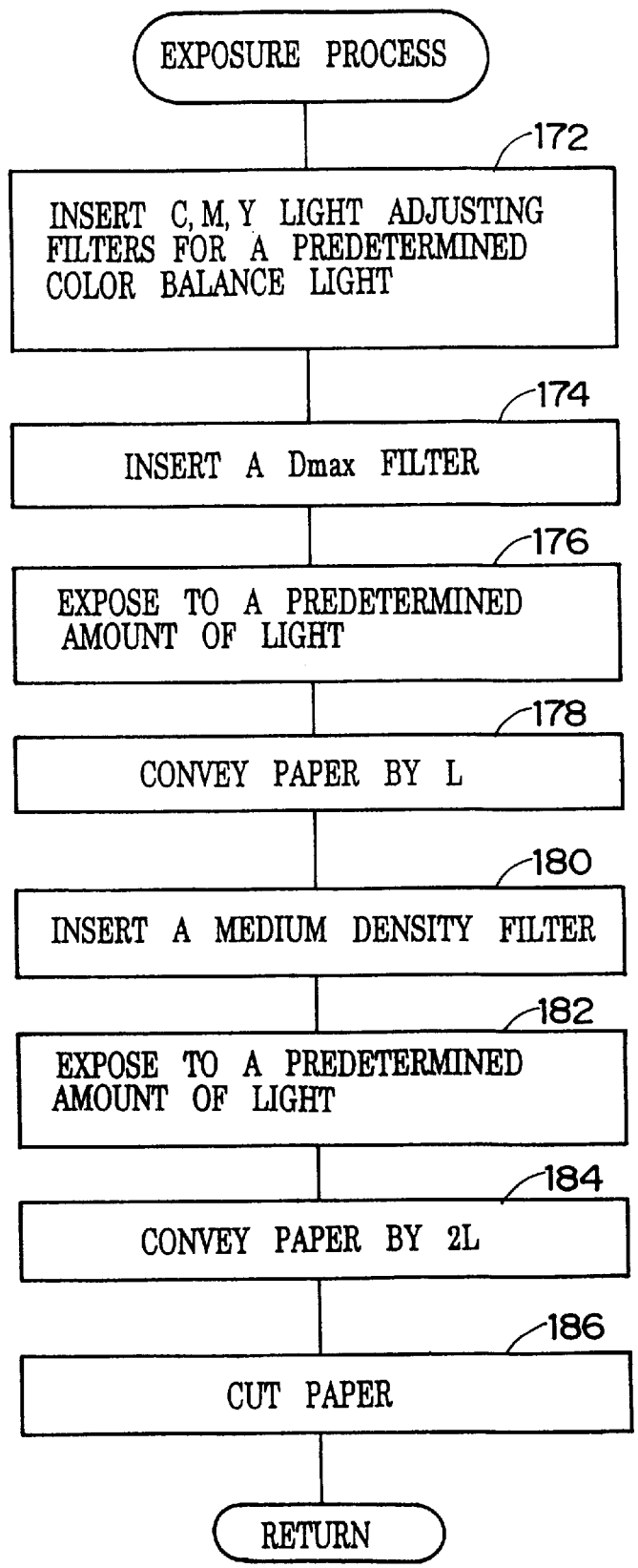
FIG. 8 is a flow chart showing a subroutine of an exposure process.

In the following step 106 in FIG. 5, master balance printing condition maintenance shown in detail by FIG. 7 is carried out. In step 152 in FIG. 7, an exposure process shown in detail by FIG. 8 is carried out.

Hereafter, the exposure process shown by FIG. 8 will be explained briefly. Based on data obtained by light source correction, the light-adjusting filters 70 for C (cyan), M (magenta), and Y (yellow) are appropriately inserted in a light path so that a predetermined amount of light with a predetermined color balance can be obtained (step 172). The $D_{max}$ ND filter 68A is then inserted in the light path, and exposure with a predetermined amount of light is carried out (steps 174 and 176). As a result, the exposure with the predetermined amount of light reduced by the $D_{max}$ ND filter is carried out on the paper P, and an exposed area A1 corresponding to the $D_{max}$ ND filter is created on the paper P as shown by FIG. 4. The paper P is then conveyed by a conveying amount L equivalent to one frame, and prepares for the next exposure (step 178).

The medium density ND filter 68B is then inserted in the light path instead of the $D_{max}$ ND filter 68A, and exposure with a predetermined amount of light is carried out (steps 180 and 182). As a result, the exposure with the predetermined amount of light reduced by the medium density ND filter is carried out on the paper P, and an exposed area A2 corresponding to the medium density ND filter 68B is created on the paper P as shown by FIG. 4. The paper P is conveyed by two times the conveying amount L (i.e., 2L), and prepares for the next exposure (step 184). By conveying the paper P by 2L, an unexposed area A3 shown by FIG. 4 is created next to the exposed area A2 of the paper P. The paper P is cut by the cutter 26 (step 186), and the procedure returns to the main routine in FIG. 7.

After the exposure process in the step 152 in FIG. 7 has finished, the paper P is sequentially carried to the color development process tank 10N1, the bleach-fixing process tank 10N2, the rinse process tanks 10N3–10N6, and the drying tank 10N7 in the processing section 21 in the following step 154. By this step, predetermined development, fixing, rinsing and drying processes are carried out on the paper P and a color print is produced. The produced print is conveyed to the diverging route R which is switched by the switching device 24, and reach a position of measurement by the densitometer 22.

In the following step 156, density measurement on the exposed areas A1, A2 and unexposed area A3 shown by FIG. 4 is carried out by the densitometer 22 for each color component C, M, and Y.

In the following step 158, exposure condition correction is calculated to keep the printing density of each color component C, M, and Y (as an example, the printing density here means the density of the exposed area A2 in neutral gray, and hereafter it is called A2 density) in a predetermined range. In the next step 160, the master balance for each color component C, M, and Y or a processing solution balance is updated in response to the exposure condition correction calculated in the above step, while the updated master balance is stored in the storage device 88. The updated master balance is the correction parameter equivalent to the master correction parameter or the processing solution correction parameter of the present invention, and for correcting the exposure conditions in response to changes including the change in the processing solution state.

The values of the master balance or the processing solution balance are stored consecutively up to 100 times without erasing the previous values. The dates of master balance update are also stored at the same time. On the 101st day, the oldest data is automatically erased and the latest master balance value and the update date are stored.

The master balance values updated at a time immediately after the chemical mixing of processing solution or at a time the processing solution is in a preferable state because of the control strip processing are stored as a reference master balance (equivalent to the reference master correction parameter or the reference processing solution correction parameter), and are not erased on the 101st day. They are stored until a new reference master balance or a new reference processing solution balance replaces them.

By the above-described master balance printing condition maintenance in step 106 in FIG. 5, the master balance for each color component C, M, and Y for exposure condition correction is updated.

Figure 26:
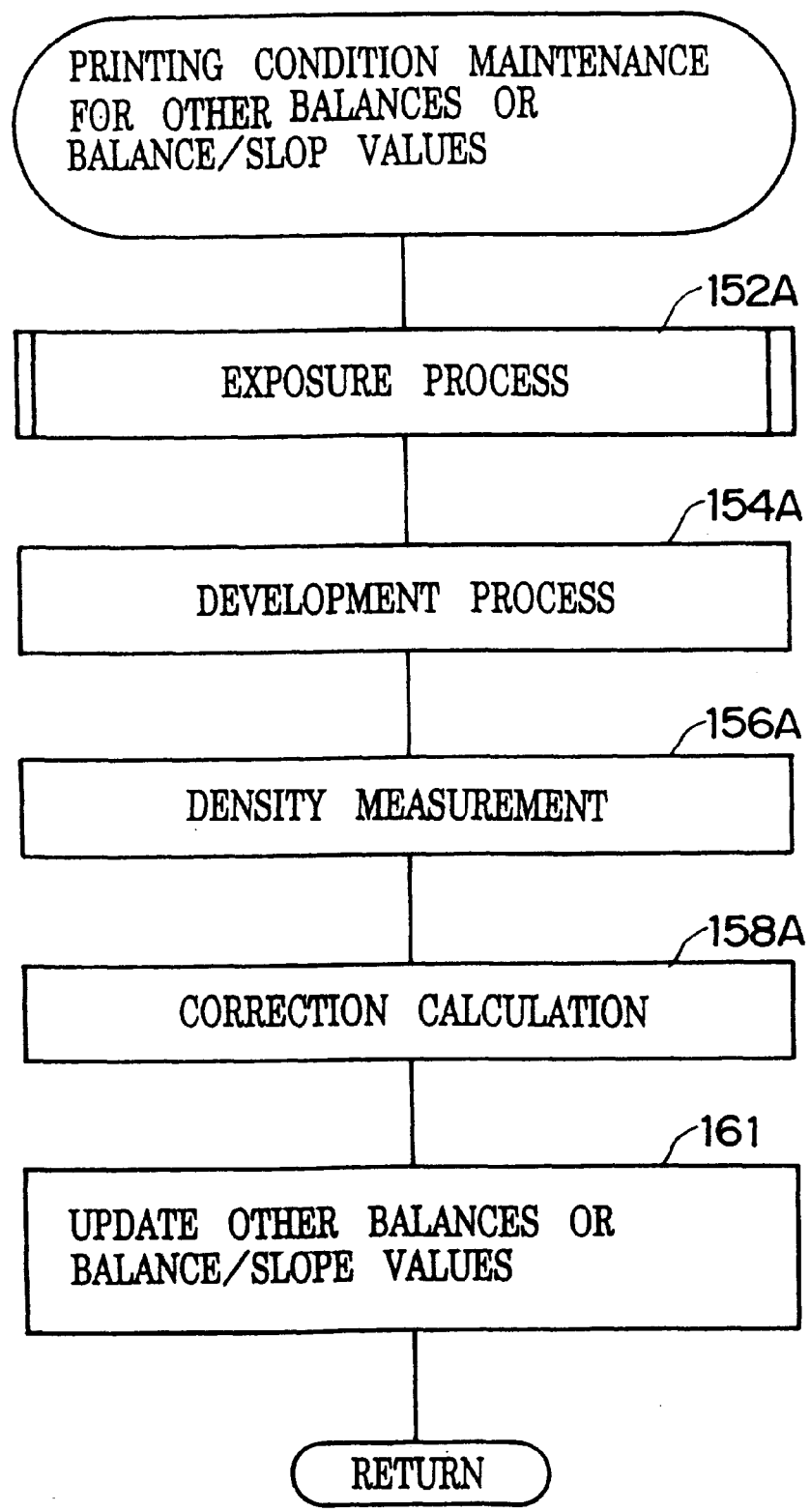
FIG. 26 is a flow chart showing a subroutine for maintaining printing condition of other balances or balance/slope values.

The automatic paper condition setting carried out in the step 144 in FIG. 6 is carried out in a control routine shown by FIG. 26 which is almost the same as the above-described control routine in FIG. 7. In the control routine shown by FIG. 26, a process which is not the same as in FIG. 7 has a step number which ends in "A". In step 158A in FIG. 26, exposure condition correction values are calculated so that the printing density of each color component C, M, and Y falls within a predetermined range. In step 161, the paper balance for each color C, M, and Y is updated based on the calculated exposure condition correction values for each color component C, M, and, and the latest paper balance is stored in the storage device 88.

In steps 108, 110, and 112 in the main routine shown in FIG. 5, the processing solution condition is determined as will be described below. Specifically, it is determined whether or not the solution is in a preferable condition based on the history of change of the master balance.

In the step 108, the updated master balance for each color C, M, and Y is compared with the reference master balance (hereafter called a first comparison process). In the following step 110, the updated master balance for each color component C, M, and Y is compared with the last-time master balance (hereafter called a second comparison process) Furthermore, in the step 112, the updated master balance for each color component C, M, and Y is compared with an average of the past 10 master balance values (hereafter called a third comparison process).

Meanings of the first to third comparison processes will be explained below in detail.

By the first comparison process, how much the master balance differs from the master balance after chemical mixing of processing solution is understood. If characteristics of parts used in the exposure system, the photometric system, or the densitometer do not change, the difference approximately means the change in processing solution performance. By this value, the processing solution performance can be judged or determined for several months. However, the difference is not constant and caused by the characteristic change in devices. Therefore, it is preferable to perform the control strip processing every six months or so, and update the reference master balance. As the reference master balance, the master balance when the average value of the past 10 master balance values, which will be described later, is stable can be used.

By the second comparison process, a sudden processing solution state change can be detected. The comparison result normally falls within a certain measurement fluctuation range. When it changes greatly, its causes can be limited to contamination of the processing solution due to, for example, an earthquake or malfunctioning of the parts used in the densitometer and the photometric system.

By the third comparison process, recent change in a trend of the processing solution state can be understood. Here, the difference between the latest master balance values and the average of the past 10 master balance values is used, but any number of the past master balance values can be used within a limit of a memory capacity. For example, only the average of the past 10 master balance values is used here, while the average of the past 10 more times (i.e., 11 to 20 times before the latest) master balance values or the average of the past 10 further more times (i.e., 21 to 30 times before the latest) master balance values can be used as a judgment condition, which leads to more accurate judgment or determination of the change in trend in the processing solution state.

Figure 10:
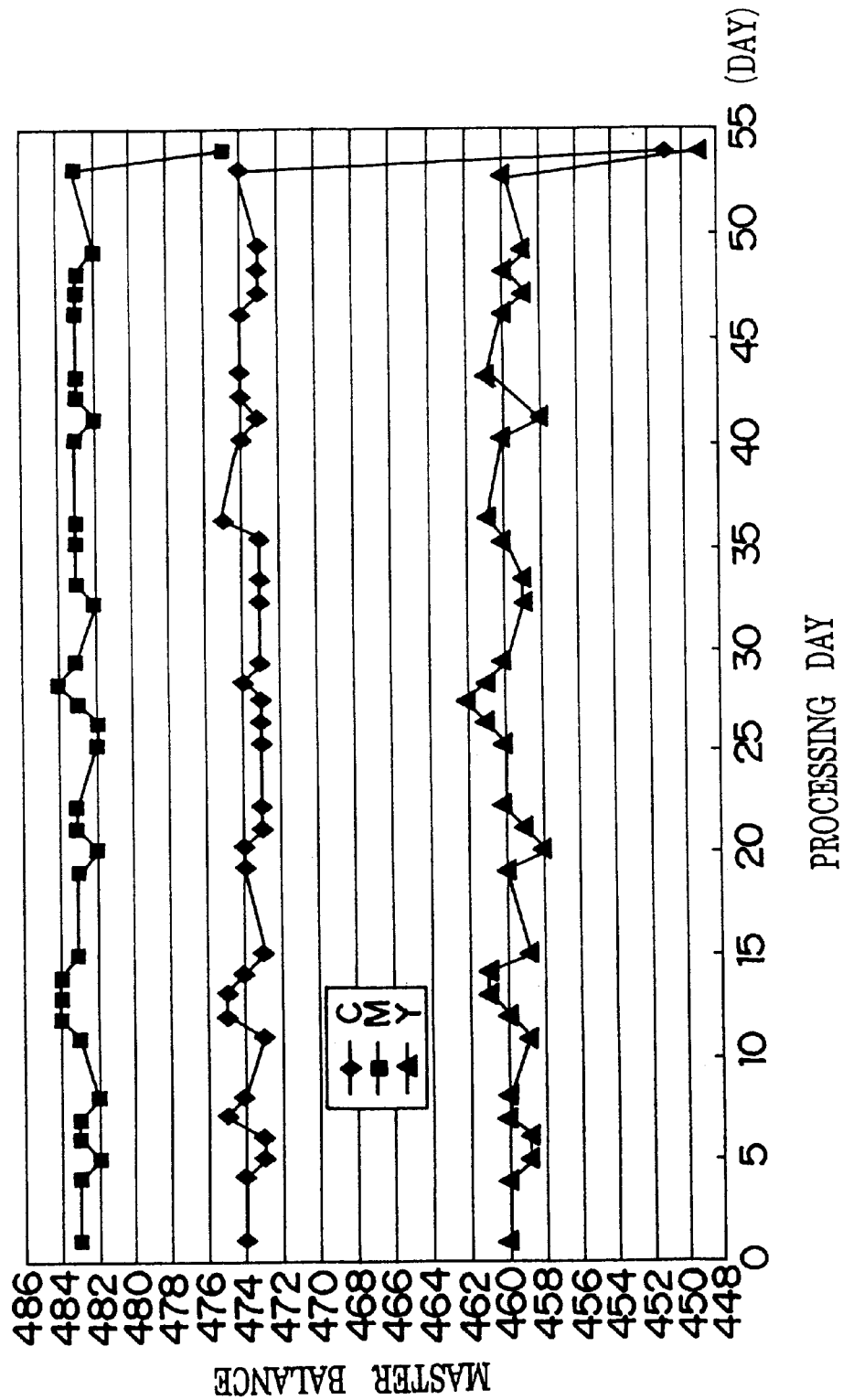
FIG. 10 is a graph showing a temporal change in master balance in operation in event 1.
Figure 11:
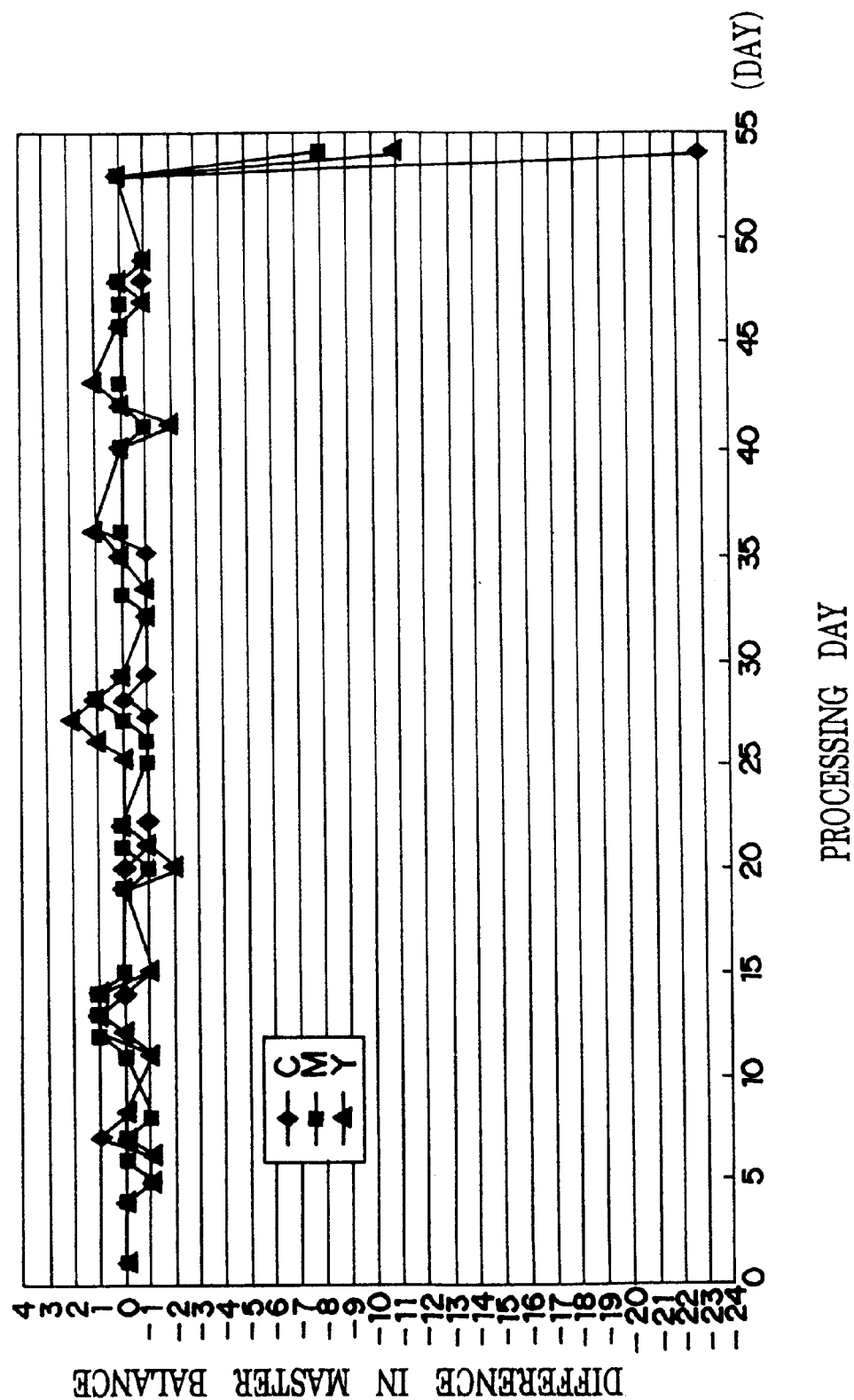
FIG. 11 is a graph showing a temporal change in difference between a master balance and a reference master balance in event 1.
Figure 12:
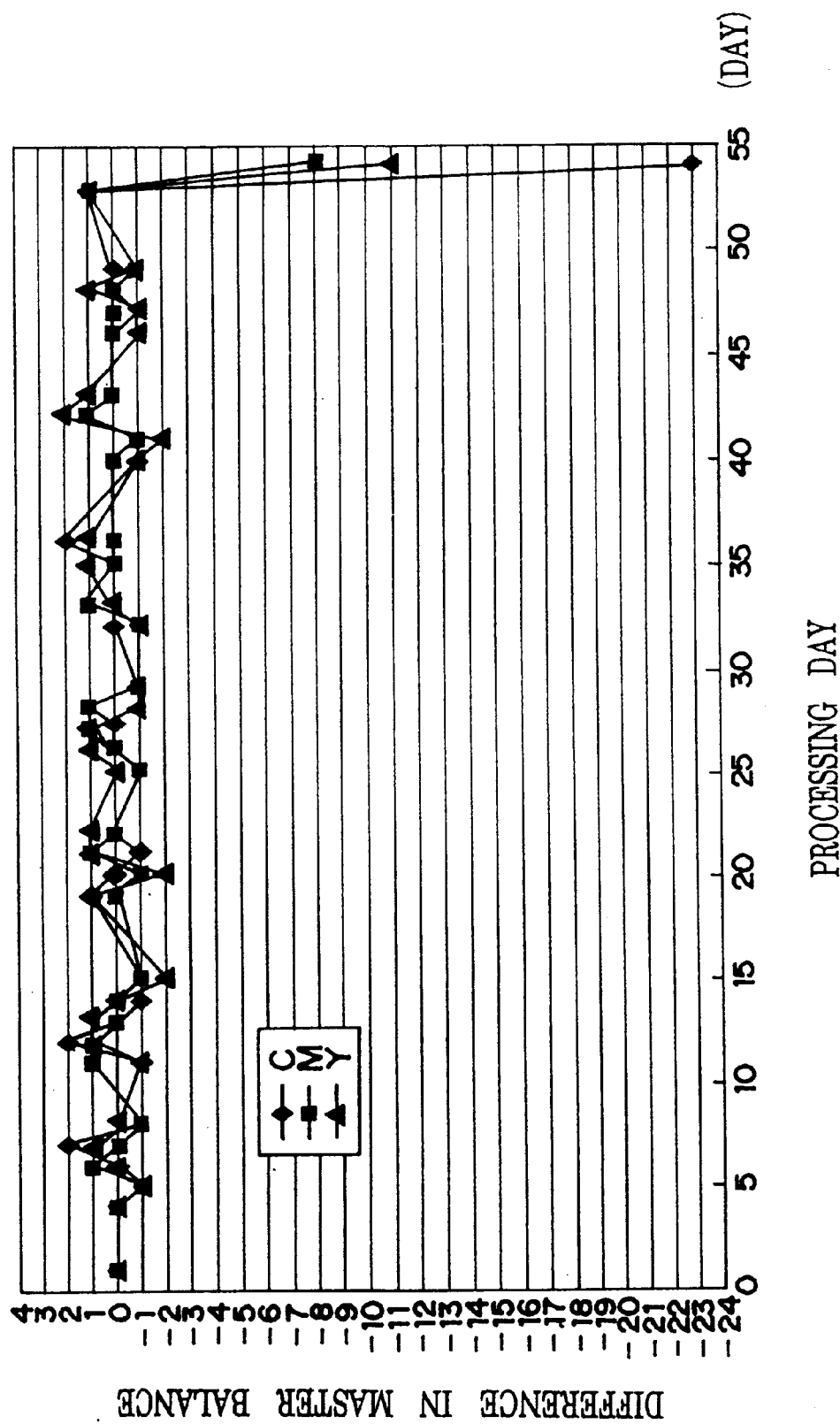
FIG. 12 is a graph showing a temporal change in difference between a latest master balance and a master balance one day prior to the latest in event 1.
Figure 13:
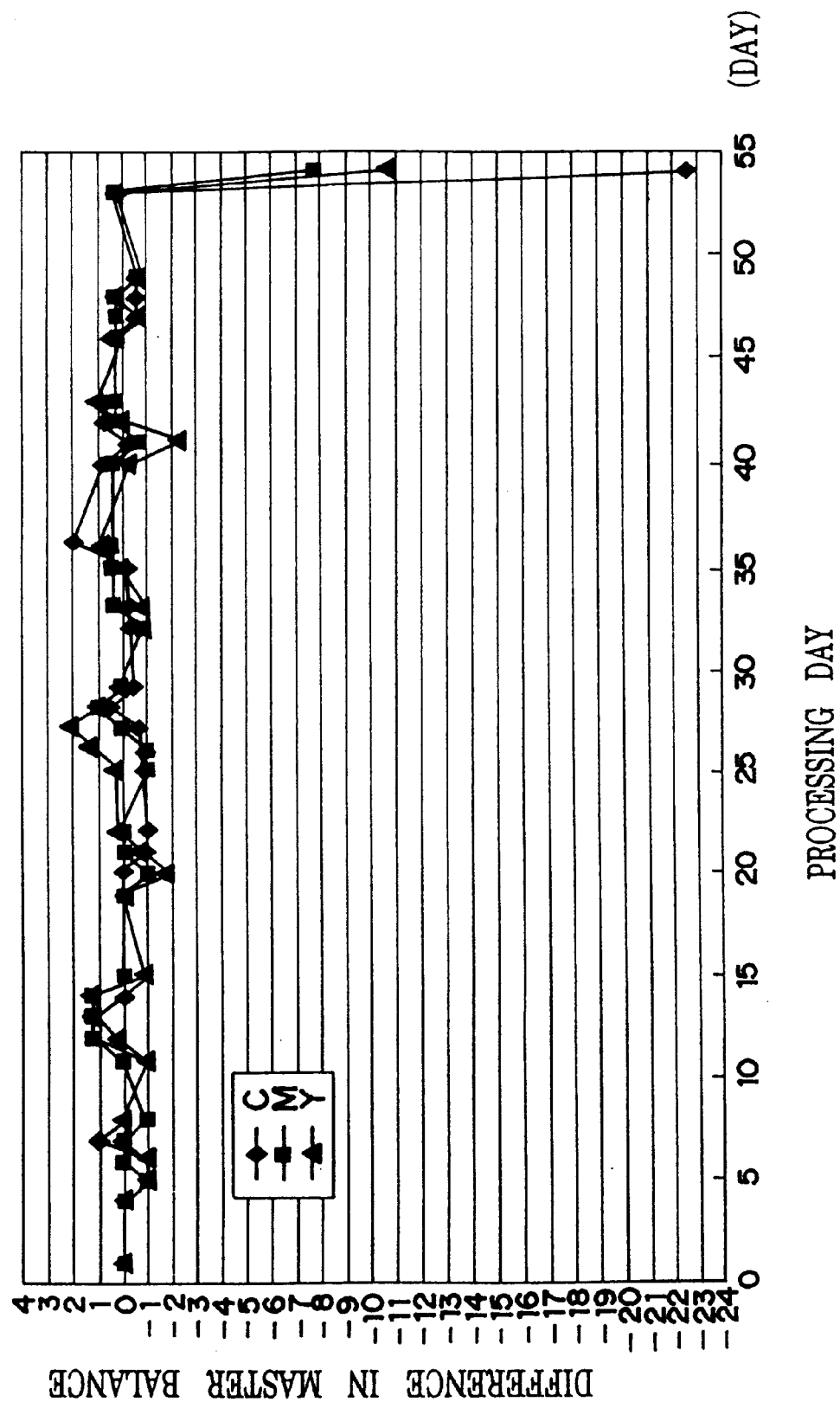
FIG. 13 is a graph showing a temporal change in difference between a master balance and an averaged master balance in event 1.

For example, if an intentional contamination occurred on the 53rd day from the measurement starting day (event 1), the master balance value in operation changes rapidly on the 53rd and 54th days as shown by a graph in FIG. 10. In this case, the differences of the master balance by the first comparison process from the reference master balance show temporal changes as shown by graphs in FIG. 11. The differences of the latest master balance by the second comparison process from the master balance one day prior to the latest measurement show temporal changes as shown by graphs in FIG. 12. The differences of the master balance value by the third comparison process from the master balance average in 10 days show temporal changes as shown by graphs in FIG. 13. In any graph in FIGS. 11 to 13, the values change rapidly on the 53rd and 54th days, and a factor which acts suddenly (for example, contamination as described above) can be detected. In the above examples, master balance values decreased rapidly. However, if the master balance values increase rapidly, it is often the case where a part used in the densitometer or the photometric system has a trouble.

Figure 14:
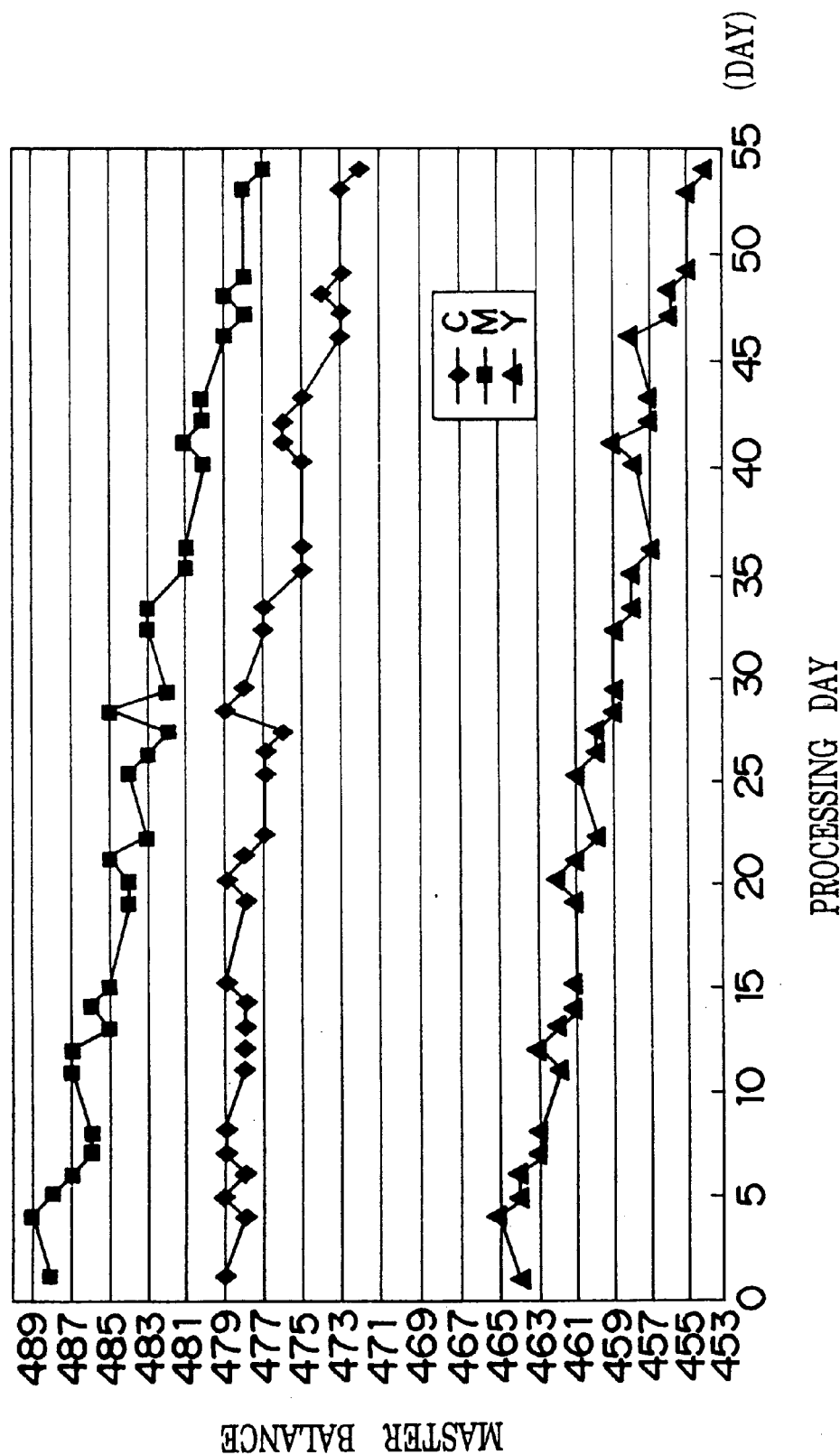
FIG. 14 is a graph showing a temporal change in master balance in operation in event 2.
Figure 15:
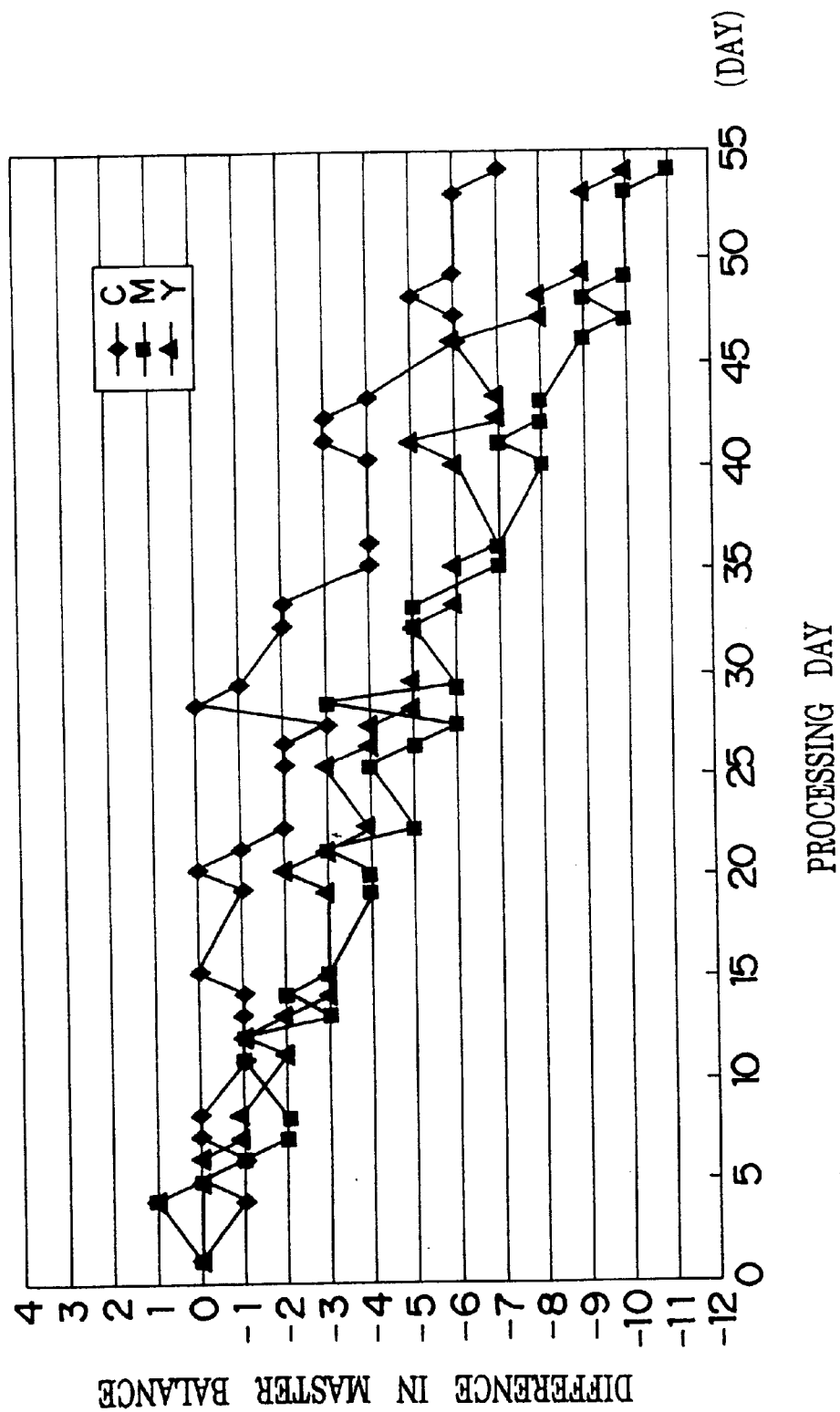
FIG. 15 is a graph showing a temporal change in difference between a master balance and a reference master balance in event 2.

As shown by FIG. 14, if the master balance values gradually decrease in operation (event 2), the differences of the master balance value by the first comparison process from the reference master balance show temporal changes as shown by graphs in FIG. 15. The differences of the master balance value by the second comparison process from the master balance value one day prior to the latest measurement show temporal changes as shown by graphs in FIG. 16. The differences of the master balance value by the third comparison process from the master balance average in 10 days show temporal changes as shown by graphs in FIG. 17.

Figure 16:
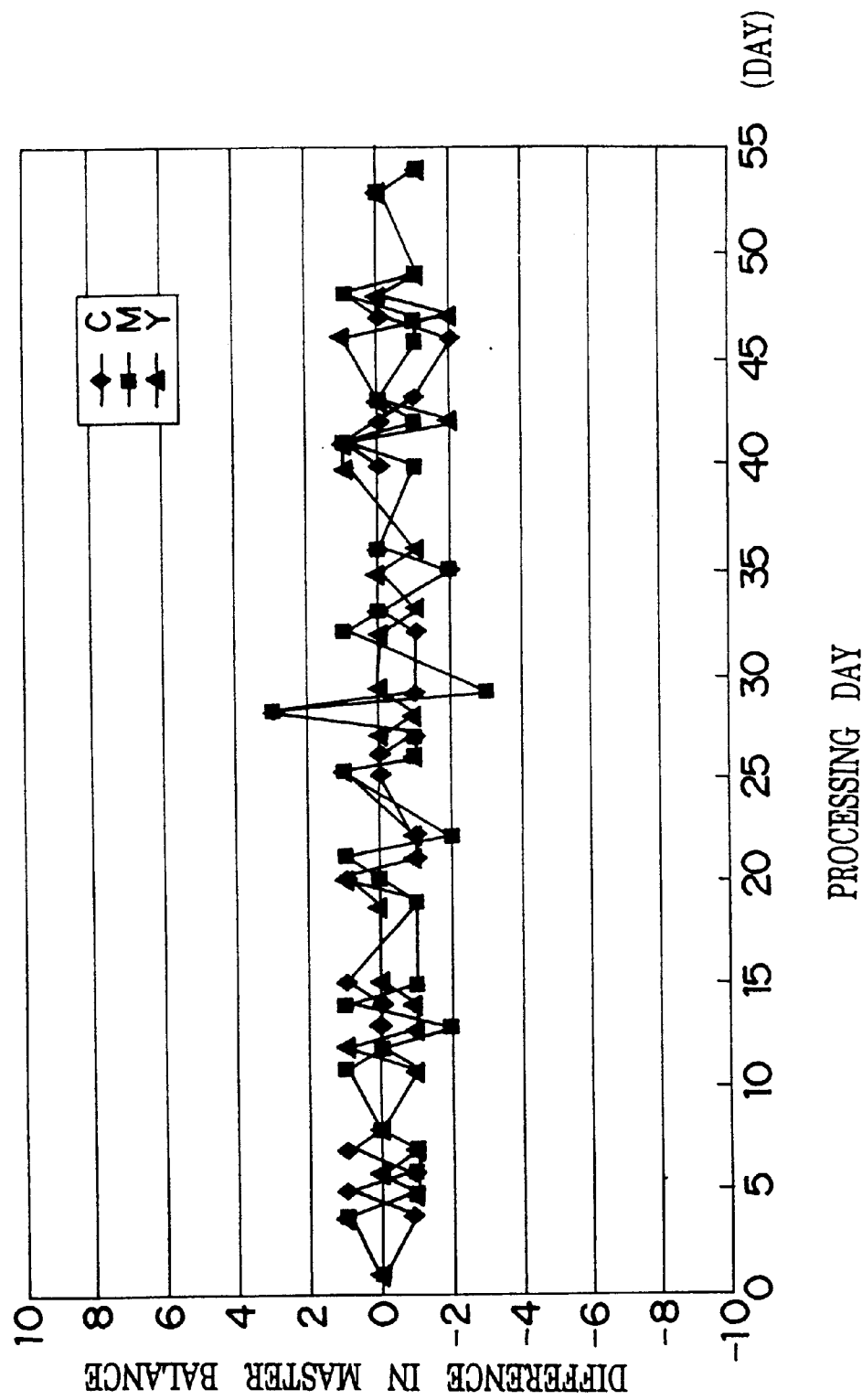
FIG. 16 is a graph showing a temporal change in difference between a latest master balance and a master balance one day prior to the latest in event 2.
Figure 17:
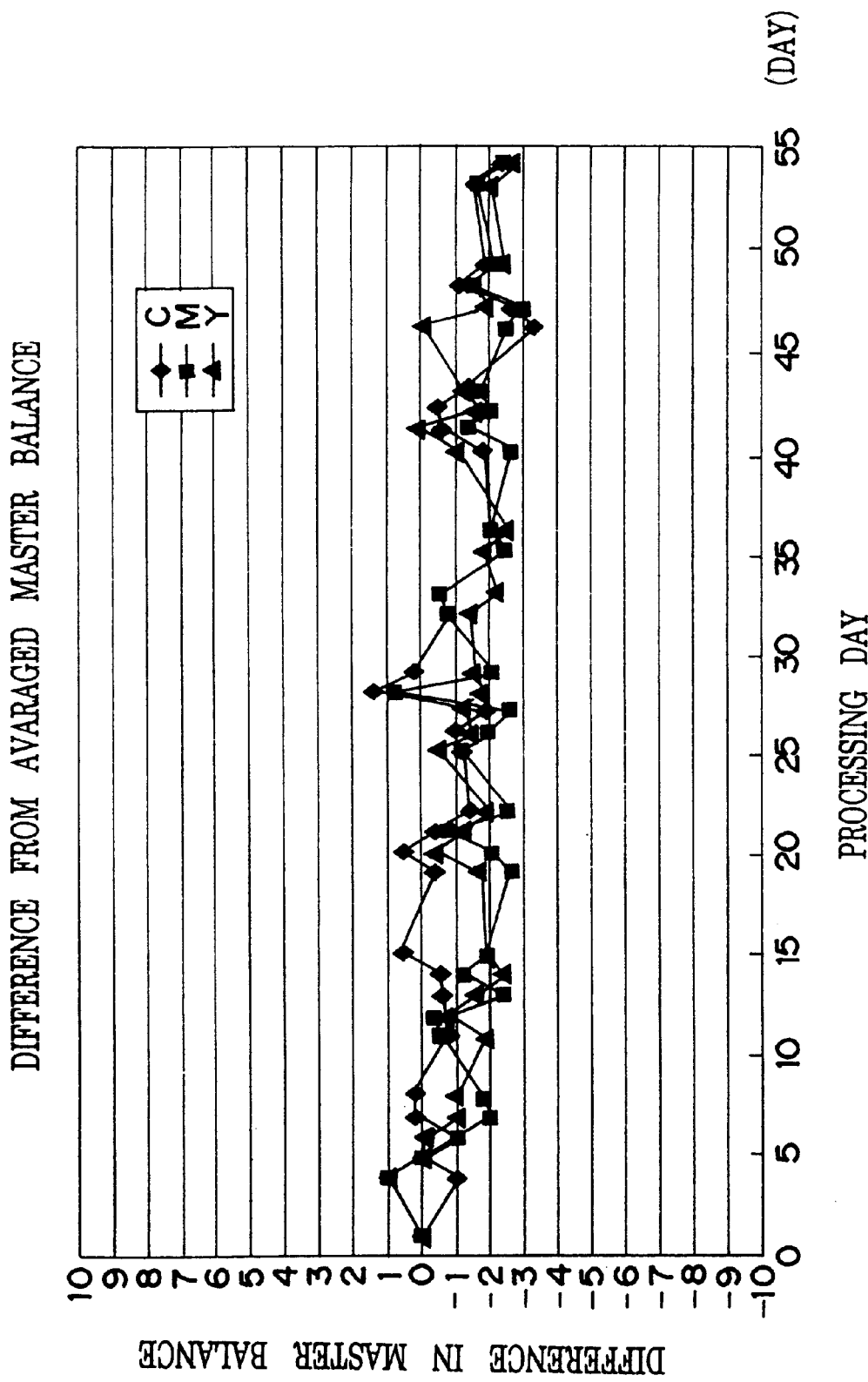
FIG. 17 is a graph showing a temporal change in difference between a master balance and an averaged master balance in event 2.

No great temporal change in difference of the master balance value from master balance value one day prior to the latest measurement is seen in FIG. 16. However, it is seen from FIG. 17 that the master balance values are decreasing slightly from the master balance value average in 10 days, and FIG. 15 obviously shows the trend of decrease of the master balance values from the reference master balance values. It is inferred that a cause of this trend is not the suddenly-changing factor described above, but the factor which is gradually changing. For example, the cause is inferred that the replenished water is less than the water evaporation from the processing solution, or excess replenishment of the processing solution.

It is more preferable to notify the malfunctioning part by searching the amount of paper P which has already processed, the amount of the replenishment and the remaining processing solution (or the number of times of chemical mixing of processing solution), all of which being stored in the printer processor 10, as well as the amount of rinsing water used for adding water (or the number of times of rinsing water mixture) so that the malfunctioning part candidate can be narrowed down.

Figure 18:
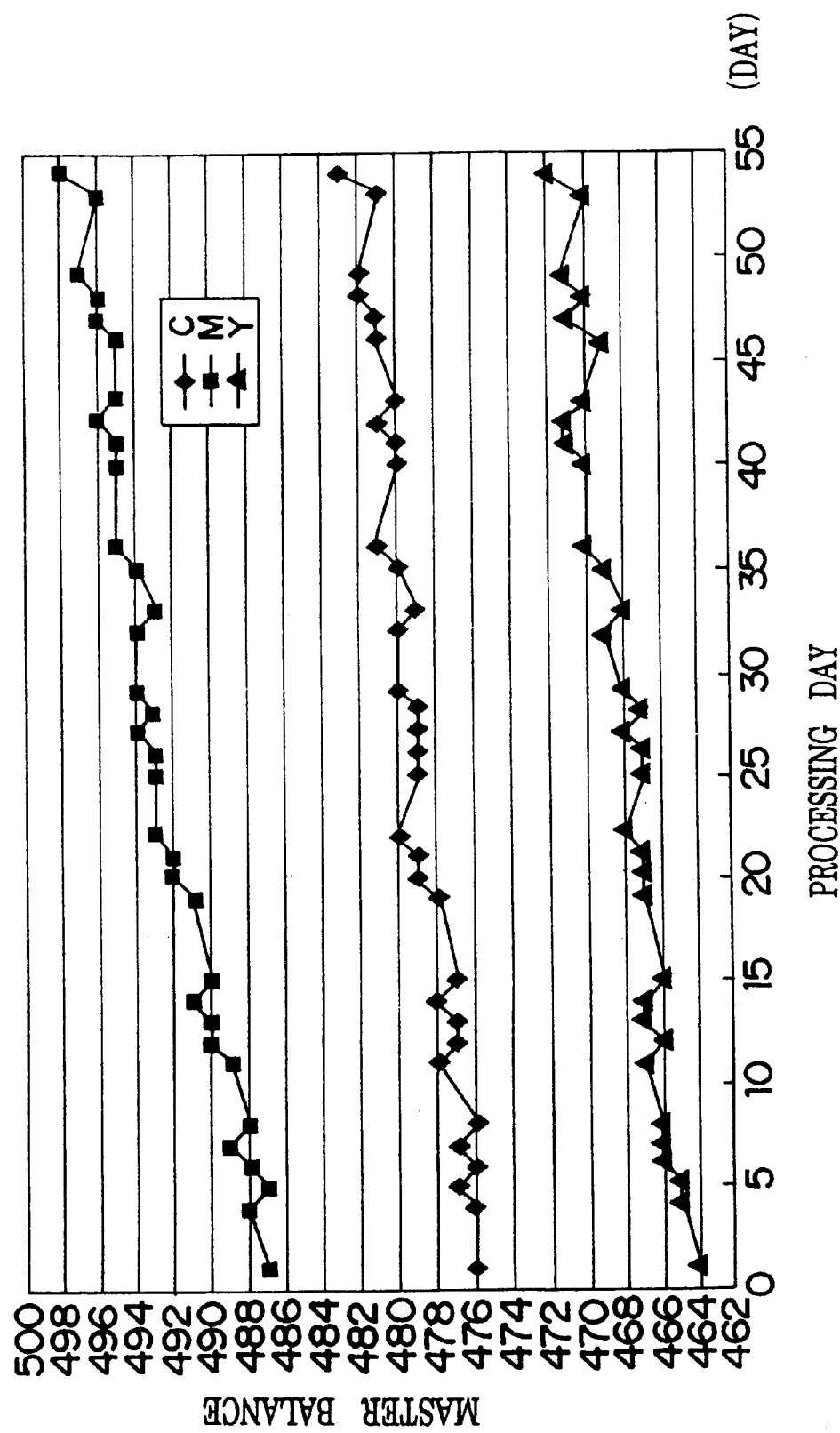
FIG. 18 is a graph showing a temporal change in master balance in operation in event 3.
Figure 19:
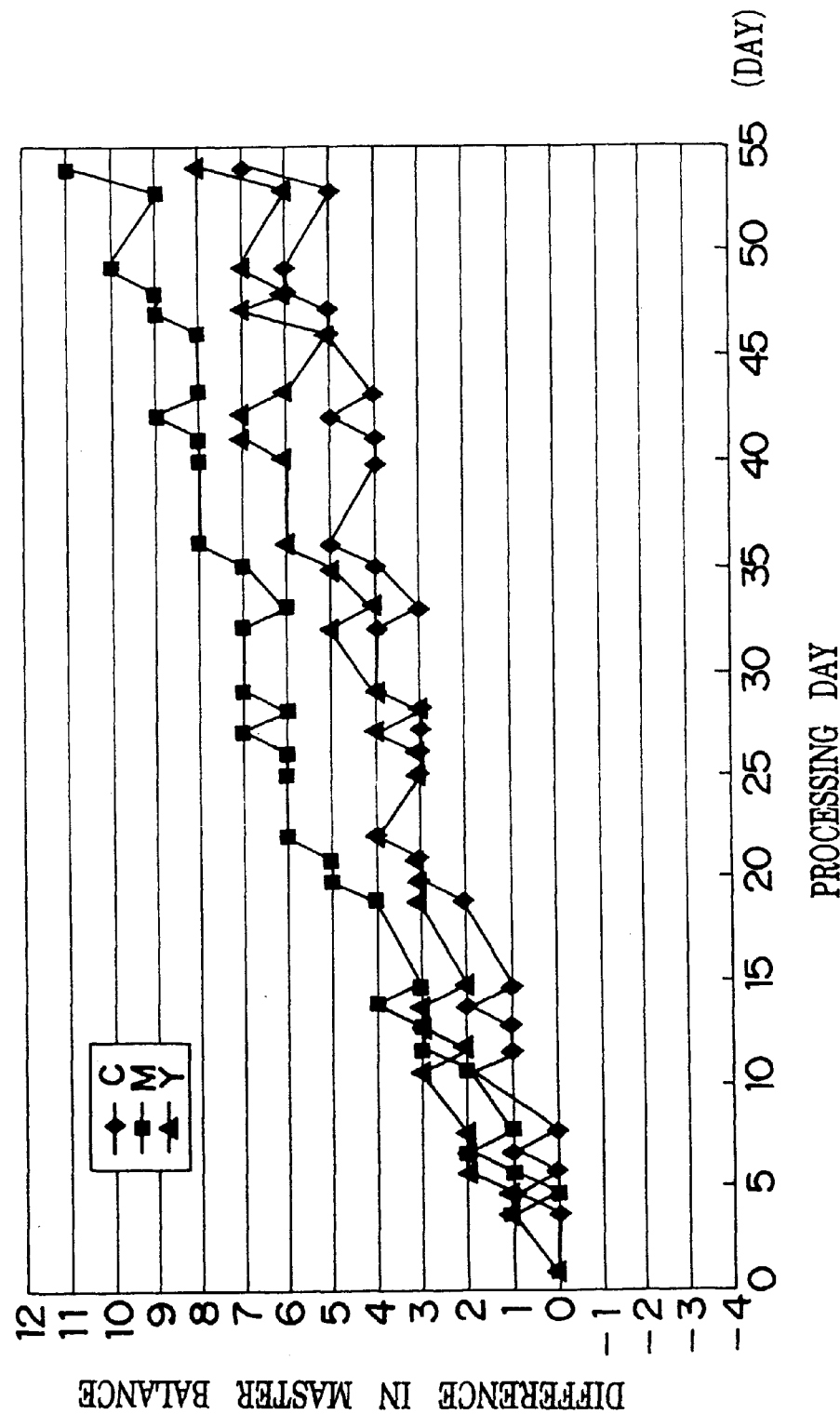
FIG. 19 is a graph showing a temporal change in difference between a master balance and a reference master balance in event 3.

Moreover, for example, if the replenished water is more than the water evaporation from the processing solution due to a malfunctioning evaporation correction system, or the replenishment of the processing solution is intentionally reduced (event 3), the master balance value in operation gradually increases as shown by the graph in FIG. 18. In this case, the differences of the master balance value by the first comparison process from the reference master balance value show temporal changes as shown by graphs in FIG. 19. The differences of the master balance value by the second comparison process from the master balance value one day prior to the latest measurement show temporal changes as shown by graphs in FIG. 20. The differences of the master balance value by the third comparison process from the master balance value average in 10 days show temporal changes as shown by graphs in FIG. 21.

No great temporal change in difference of the master balance value from the master balance value one day prior to the latest measurement is seen in FIG. 20. However, it is seen from FIG. 21 that the master balance values are increasing slightly from the master balance average in 10 days, and FIG. 19 obviously shows the trend of increase of the master balance values from the reference master balance values. It is inferred that a cause of this trend is not the suddenly-changing factor described above, but the factor which is gradually changing (for example, malfunctioning water evaporation system or refill of the processing solution less than needed).

After the first to third comparison processes described above, in the step 114 in FIG. 5, the processing solution is determined whether or not it is in a preferable state by determining whether or not the differences resulted from each of the first to third comparison process fall within a predetermined range, for example, within ±10.

If the differences resulted from all of the first to third comparison processes fall within ±10, the procedure goes to the step 116, and a message notifying that no abnormality is detected in the processing solution is shown on the display 58, and the procedure ends.

On the other hand, if the differences resulted from any of the first to third comparison processes fall beyond ±10, the processing solution is determined to have an abnormality, and the procedure goes to the step 118. A message notifying that an abnormality is detected in the processing solution is shown on the display 58. At the same time, information showing the temporal change in the first to third comparison process results is sent to the host computer 94 in the control center 95 via the communication line 92.

According to the present embodiment described above, an operator of the printer processor 10 can promptly detect the state of the processing solution without performing the complex process for the processing solution performance confirmation using the conventional control strip. By determining the state of the processing solution through the automatic run of the control routine in FIG. 5 at the beginning of daily operation, daily process for processing solution performance confirmation using the control strip is abolished, and daily work load can be reduced.

Since the change in trend in the processing solution performance can be monitored through the first to third comparison processes, if the processing solution state is deteriorating, the cause of the processing solution state deterioration or degradation can be more easily specified based on the change trend in the deterioration, and the operator can take appropriate measures.

In this embodiment, the abnormality in the processing solution state can be notified promptly to the control center 95. Following this notice, the control center 95 can detect the abnormality and understands what the abnormality is by receiving information showing the temporal change in the first to third comparison process results. The control center 95 can order or advise the operator of the printer processor 10 to take appropriate measures.

In the event 2 (the case where the master balance value gradually decreases) and the event 3 (the case where the master balance value gradually increases), the master balance itself performs the correction of the exposure control until essential measures such as a repair of a pump are taken. Therefore, if the operation continues as it is, a preferable print can be produced without affecting the picture processing performance to a certain degree. However, if the abnormality can not be detected during the time the change in the master balance stays in a predetermined controllable range as in the present embodiment (in this case ±10), an appropriate correction can not be carried out if the density deviates greatly from the A2 density, while it is possible to correct the density using the master balance if it stays near the A2 density. Therefore, in actual printing, the abnormality in the processing solution state is understood after the appropriate correction becomes no longer possible. Once the state is deteriorated to this degree, the processing solution should be exchanged to fresh processing solution immediately, and the printing process by the printer processor 10 should temporarily be suspended. In the present embodiment, the abnormality in the processing solution state can be detected in advance and be treated appropriately. Therefore, the processing solution state can be improved before exchanging of the processing solution. In a case where it takes long for a part or parts of the printer processor to be changed to be delivered, a preferable processing can be performed for a while, since the part can be ordered well in advance.

In the present embodiment described above, the history of change of the master balance value for each of the three color components C, M, and Y is stored respectively, and the processing solution state is determined based on the history of change thereof. However, the processing solution state may be determined by a change history of the sum of the master balance values of the three colors. Alternatively, the processing solution state may be determined by considering changes such as in the filters in the photometric system, eliminating a great change thereof (for example, the master balance value regarding the color component C).

In the above-described embodiment, that the difference in the master balance value comparison result goes beyond ±10 is used as the criterion to determine the abnormality of the processing solution. However, an arbitrary value may be set as this threshold value in response to characteristics of the printer processor.

In the printing condition maintenance in the above-described embodiment, the master balance value is updated based on the measured A2 density, and the judgment or determination of the processing solution state is carried out by the history of change in the master balance value. However, the judgment accuracy, of course, improves if the printing condition maintenance is also carried out based on a plurality of densities, such as the density of the A1 area (hereafter called A1 density) which is the highest density area, and the density of the unexposed area A3 (hereafter called A3 density), with a plurality of master balance values being stored so that the judgment of the processing solution state is carried out by the history of change of the plurality of the master balance values stored.

In the embodiment above, the accuracy in the processing solution state judgment also improves if environmental temperature is measured when the master balance value update is carried out and the judgment of the processing solution state is based on the master balance from which a temperature characteristic change of the paper P in response to a change in the temperature is eliminated (the master balance is corrected).

The paper magazine ID information may be expressed by symbols other than bar codes described above, or by symbols, characters, numbers, with all of which being printed on the back side of the paper, or a combination of them.

In the embodiment above, an example is shown in which the $D_{max}$ ND filter 68A and the medium density ND filter 68B are inserted sequentially in the light path. However, an area corresponding to the exposed areas A1, A2, and the unexposed area A3 may be created at one exposure using an ND filter comprising the parts equivalent to the $D_{max}$ ND filter 68A and the medium density ND filter 68B. The ND filters used in the printing condition maintenance such as the $D_{max}$ ND filter 68A and the medium density ND filter 68B for creating the exposed area A1 which is the highest density area, the exposed area A2 which is the medium density area, and unexposed area A3 is called a set-up filter (SUF).

The set-up filter may be composed of one medium density ND filter such as the set up filter used in the printer processor "PP720W" produced by Fuji Photo Film Co., Ltd. However, in a digital printer (a printer which records on a photosensitive material digital information obtained by reading an image recorded on a negative film by a scanner such as a CCD, using laser beam and an output device such as DMD, LCD, and CRT), it is possible to carry out exposure control by a program such as correction of the color balance in any density when the image is in a digital form. Therefore, understanding the processing solution state by test exposure in a plurality of density will become effective means.

In the printing condition maintenance of the present invention, the exposure conditions are set so that print density is in a predetermined target density, if the medium density ND filter is used as the SUF. The master balances are exposure control parameters which affect the exposure conditions in this case. The A2 density is the density measured by the densitometer placed at an exit of the processed print. If the A2 density measurement result coincides with the target density, the master balance values used in the A2 density exposure are adopted. If the A2 density differs greatly from the target density, the master balance values in response to the density difference are recalculated, and the printing condition maintenance is repeated in the same manner with the new master balance values. The printing condition maintenance is the operation for finding the exposure conditions under which the target density is achieved by test printing with the SUF. In the present application, for preferable printing in a plurality of markets, the target density is set close to an average print density in the markets. This density happens to be a density close to the control strip LD. As a consequence, the A2 density is close to the density of the control strip LD. Therefore, a later-described negative correlation between the master balance and the control strip LD is observed. If the target density is different, the correlation still exists even though the numbers are not the same.

Hereinafter, it will be explained that determining the state of the processing solution based on the history of change in the master balance is reasonable as has been carried out in the present invention, in comparison with the result using the control strip.

In the above-described case where the intentional contamination of the processing solution occurred on the 53rd day from the beginning of the processing, the control strip processing was carried out on the 54th day (in other words, the density of the print which had been produced by processing the control strip with the processing solution was measured). The density measurement result (using an X-rite densitometer) is shown by the table in FIG. 22A.

Difference between the density shown by the table in FIG. 22A and the density of reference control strip processed normally in advance at a factory is shown by the table in FIG. 22B with 100 magnification.

On the other hand, density measurement (by the X-rite densitometer) result of the control strip processed on the first day of the processing when the processing solution state is stable is shown in the table in FIG. 23A. Similarly, difference between the density shown by the table in FIG. 23A and the density of reference control strip processed normally in advance at a factory is shown by the table in FIG. 23B with 100 magnification.

If the intentional contamination had not occurred on the 53rd day, result close to the table in FIG. 23B would have been obtained on the 54th day. Therefore, LDs of the both were compared to each other on the first day and the 54th day, and the difference therebetween was obtained. The result is shown by the table in FIG. 24. From the table in FIG. 24, for the color components of magenta and yellow, it is seen that the change in the master balance and the change in LD by the control strip processing are in a negative relationship in which the signs of the values are opposite.

In the case where the master balance is gradually decreasing in operation as shown by FIG. 14, LDs measured on the first day and the 54th day when the control strip processing was performed were compared to each other, and the difference therebetween was obtained. The master balance differences were also obtained on both days. The result is shown by the table in FIG. 25. From the table in FIG. 25, for the color components of magenta and yellow as well as cyan, it is seen that the change in the master balance and the change in LD by the control strip processing are in a negative relationship in which the signs of the values are opposite.

As is obvious from the examples above, the change in LD by the control strip processing and the change in the master balance have a correlation. Therefore, it is reasonable to carry out the judgment of the processing solution state, which has conventionally been performed based on the change in LD by the control strip processing, based on the temporal change in the master balance as in the present invention.

Figure 27:
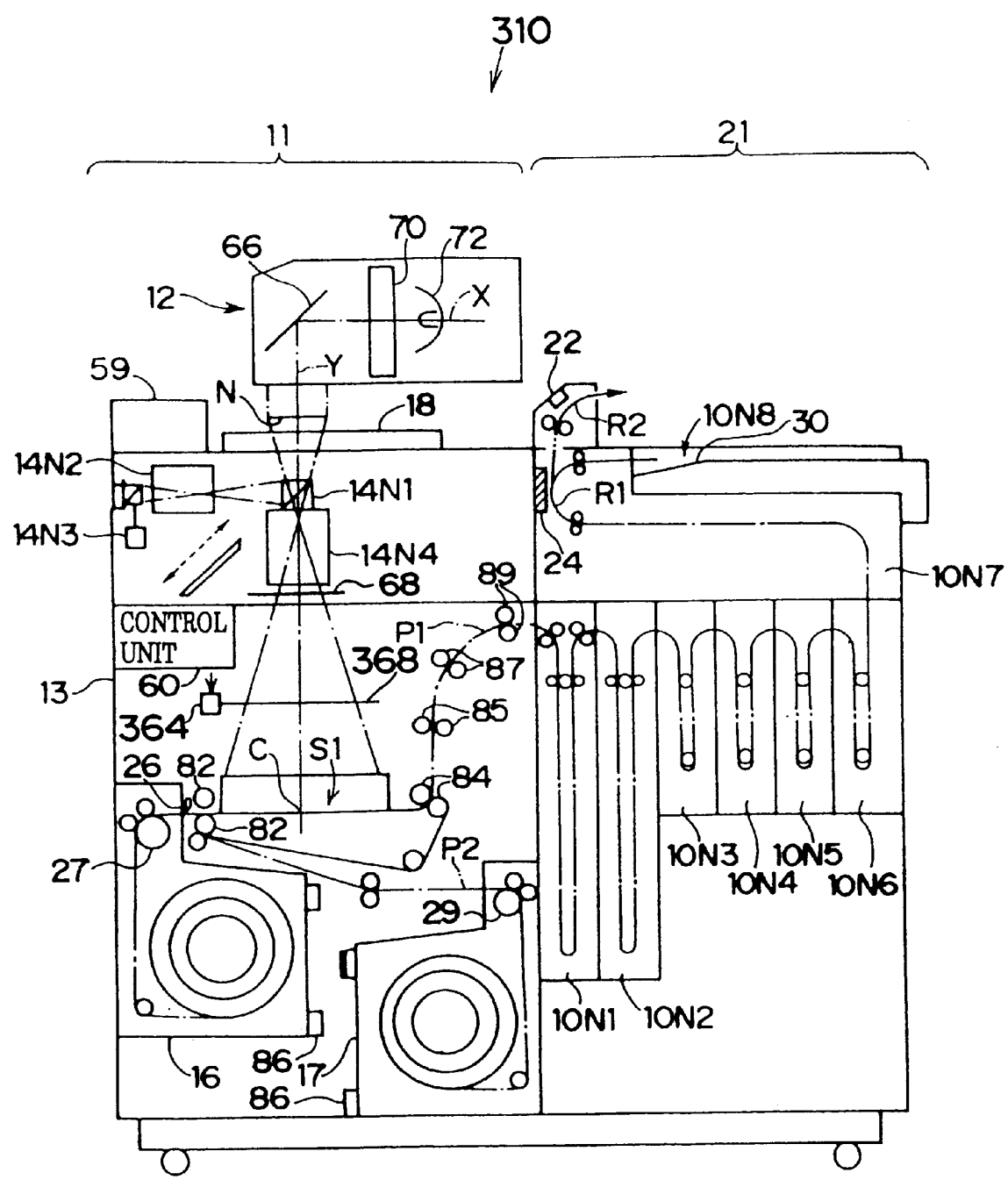
FIG. 27 is a schematic configuration of a printer processor in a second embodiment.

A second embodiment of the present invention will be explained below. A configuration of the second embodiment will be explained first. In the explanation of the second embodiment, the configuration, the materials, the parts and the like same as in the first embodiment have the same reference numerals as in the first embodiment, and detail explanation of them is not provided. As shown by FIG. 27, the printer processor 310 related to the present embodiment has a different configuration of a black shutter, and explanation regarding this difference will be provided in detail.

Figure 28:
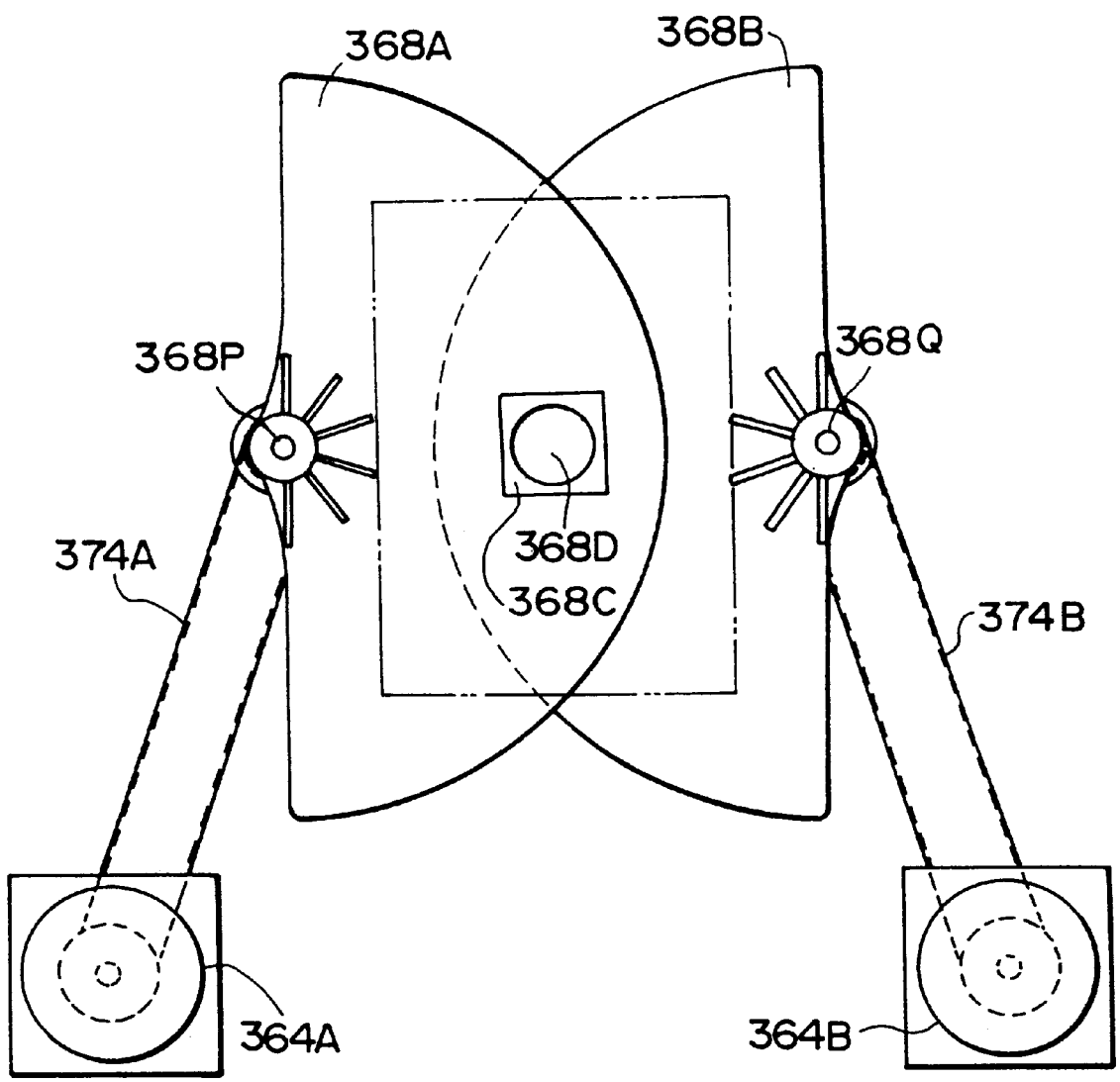
FIG. 28 is a schematic configuration of a black shutter in the second embodiment.
Figure 30:
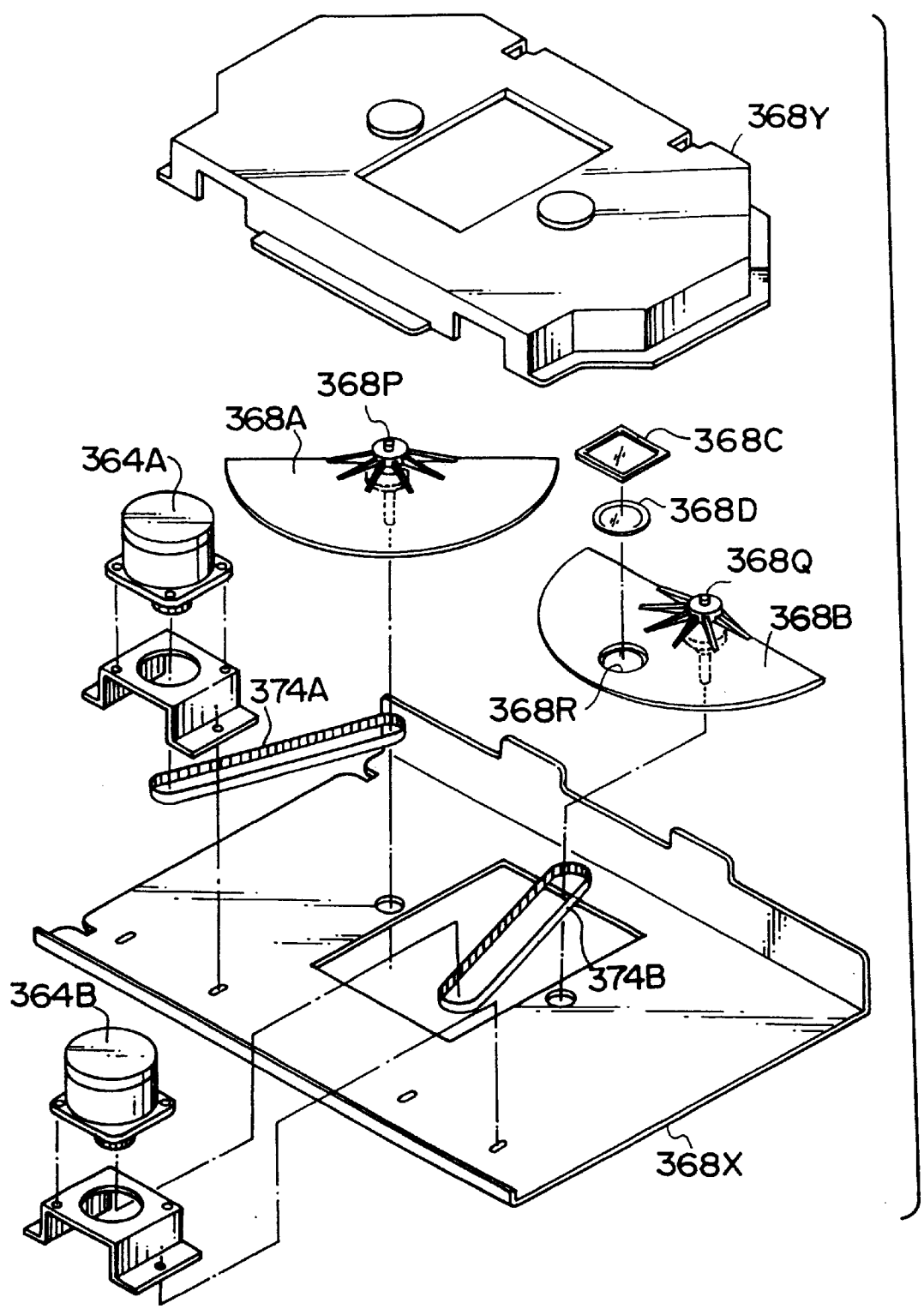
FIG. 30 is an exploded view of the black shutter in the second embodiment.

As shown by FIG. 28, the black shutter 368 comprises two shutters 368A and 368B which open and close by rotation. A black shutter driving device 364 comprises motors 364A and 364B for rotating the shutters 368A and 386B. A belt 374A which transmits a driving force from the motor 364A surrounds a rotational shaft 368P of the shutter 368A. The shutter 368A rotates around the rotational shaft 368P by the driving force from the motor 364A. Similarly, a belt 374B which transmits a driving force from the motor 364B surrounds a rotational shaft 368Q of the shutter 368B. The shutter 368B rotates around the rotational shaft 368Q by the driving force from the motor 364B. As shown by FIG. 30, the shutter 368B has a circular hole 368R where a set up filter (SUF) 386D fills in. A diffusing plate 368C covers the set up filter 368D. A base material 368X of the black shutter 368 and a covering material 368Y have approximately rectangular holes in the central portions thereof.

Figure 29:
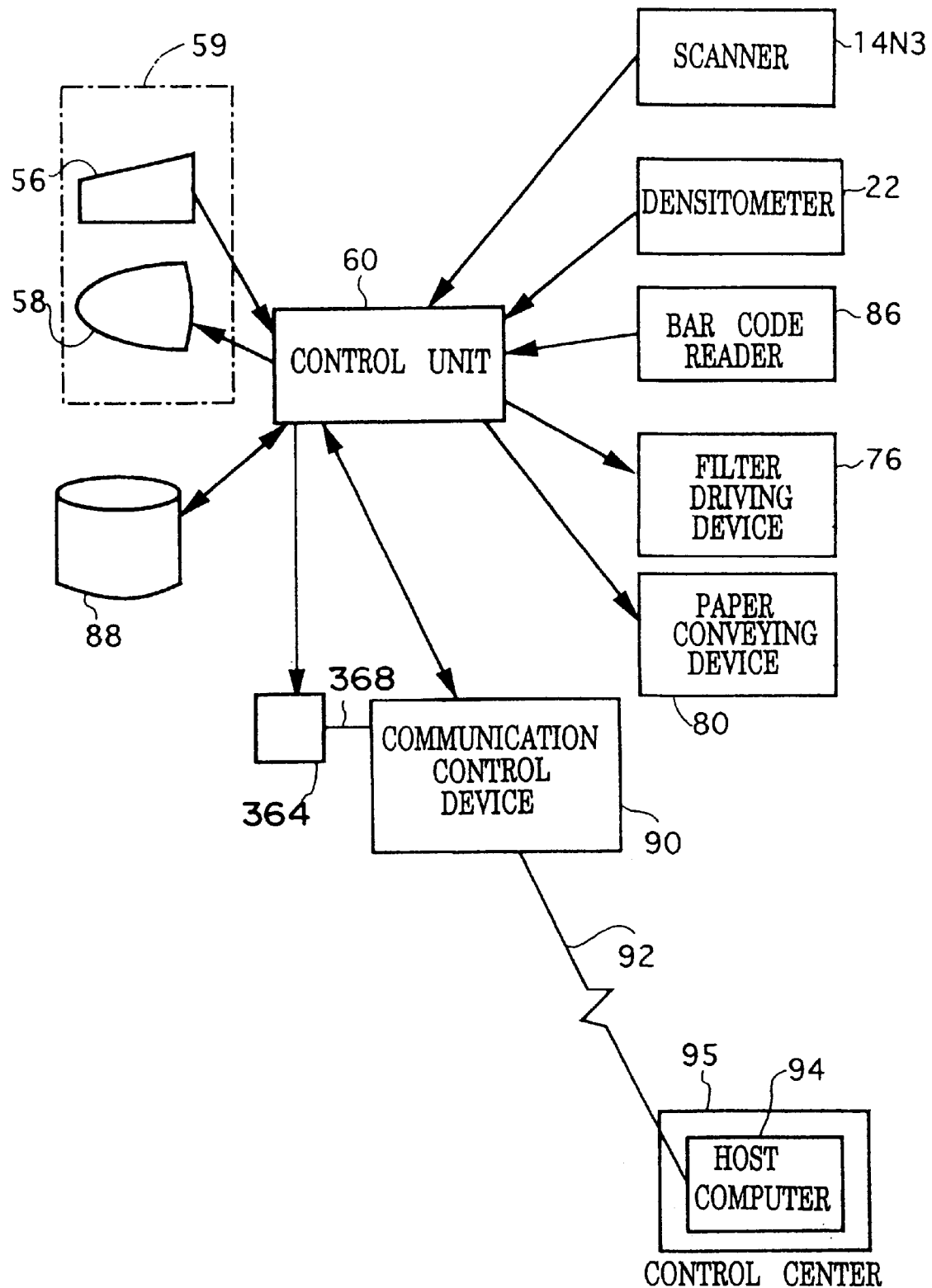
FIG. 29 is a block diagram showing a configuration of devices related to processing solution control in the second embodiment.

In such a black shutter 368, if it operates as an ordinary black shutter (total blackout), the shutters 368A and 368B are simultaneously driven to create a blackout state as shown by FIG. 28. In this blackout state shownby FIG. 28, a light passes through the set up filter 368D of the shutter 368B, while it is shielded by the shutter 368A. On the other hand, if a printing condition maintenance is carried out, starting from the blackout state, the shutter 368A rotates around the rotational shaft 368P by the driving force from the motor 364A, and a light is not shielded by the shutter 368A and passes through the set up filter 368D. The light passed through the set up filter 368D reaches a paper P and the paper P is exposed to the light. An exposure condition maintenance print on which a medium density gray scale image as shown by FIG. 29 is recorded is then obtained.

The printer processor 310 comprises a control unit 60 as a device to entirely control the processing solution. The control unit 60 comprises a microcomputer composed of a CPU, RAM, ROM, input/output port, and the like, all of which are not shown. As shown by FIG. 29, a keyboard 56 and a display 58 which compose an operation unit 59 are connected to the control unit 60. Therefore, it is possible for an operator to input information or a command through the keyboard 56, or for a message to warn the operator that the processing solution should be changed to be displayed on the display 58. Moreover, a scanner 14N3, a densitometer 22, a bar code reader 86, a paper conveying device 80, and a black shutter driving device 364 are connected to the control unit 60.

Other configurations of the printer processor 310 of the present embodiment are the same as the configurations of the printer processor 10 in the first embodiment, and detail explanation of them will not be provided here.

An operation of the present embodiment will be explained below. In the explanation of the operation of the present embodiment, the steps same as in the first embodiment have the same reference numerals, and their explanation will be omitted.

Figure 32:
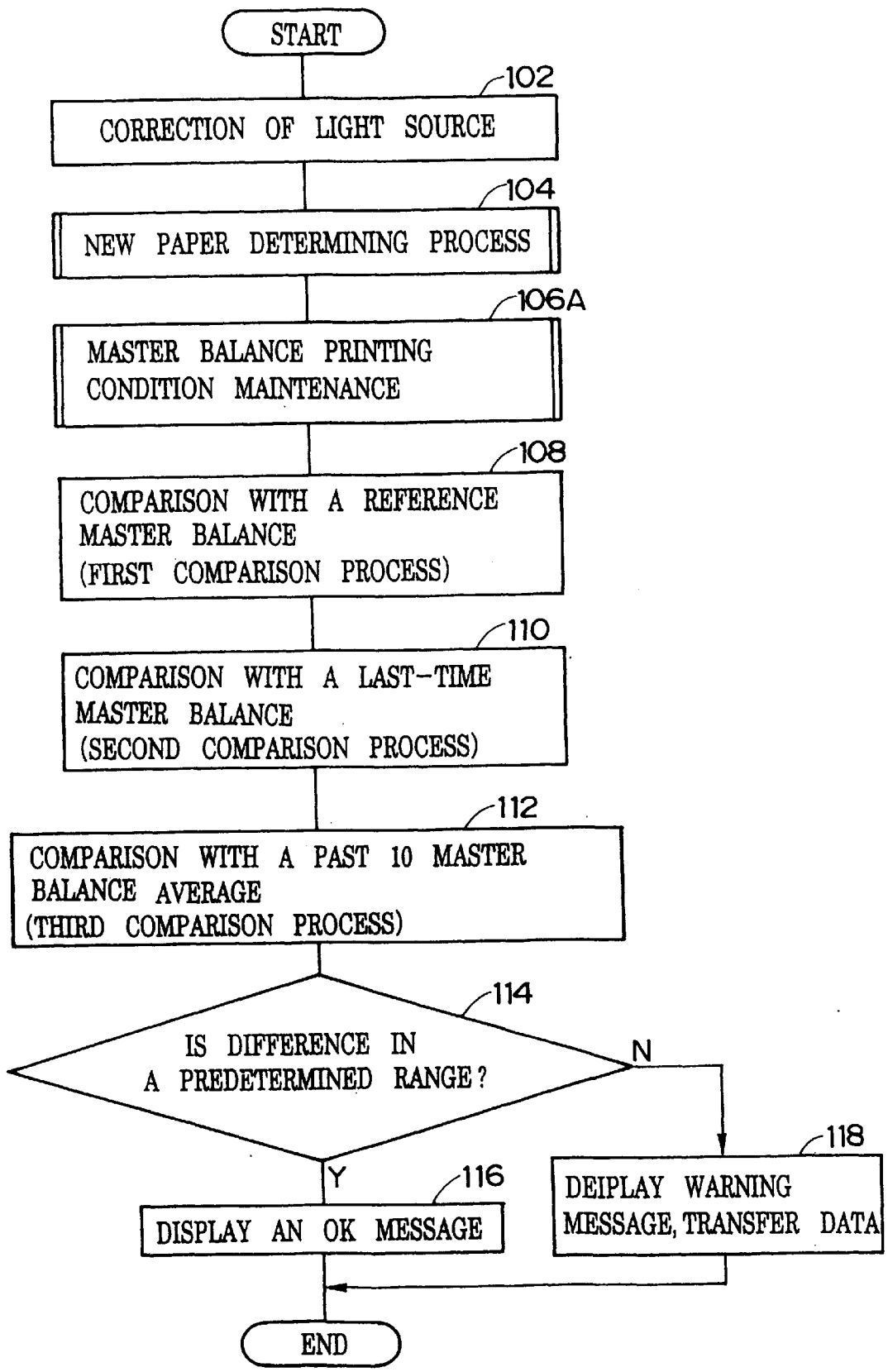
FIG. 32 is a flow chart showing a main routine in the second embodiment.

At the beginning of the daily operation, a power switch (not shown) of the printer processor 310 is switched on. After a predetermined time elapses, heat-up for raising the temperature of the processing solutions to a predetermined temperature is automatically activated. After the heat-up is finished with the temperature of the processing solutions having reached to the predetermined temperatures, a control routine shown by FIG. 32 is automatically performed by the control unit 60.

In the control unit 60, detection of the remains of the paper P is carried out in parallel to the printing process and the like. This detection of the remains of the paper P is carried out in the same manner as described in the first embodiment. Therefore, its explanation is omitted here.

A control routine shown by FIG. 32 will be explained below.

The steps 102 and 104 in FIG. 2 are the same as in the first embodiment, and their explanation is omitted here.

Figure 33:
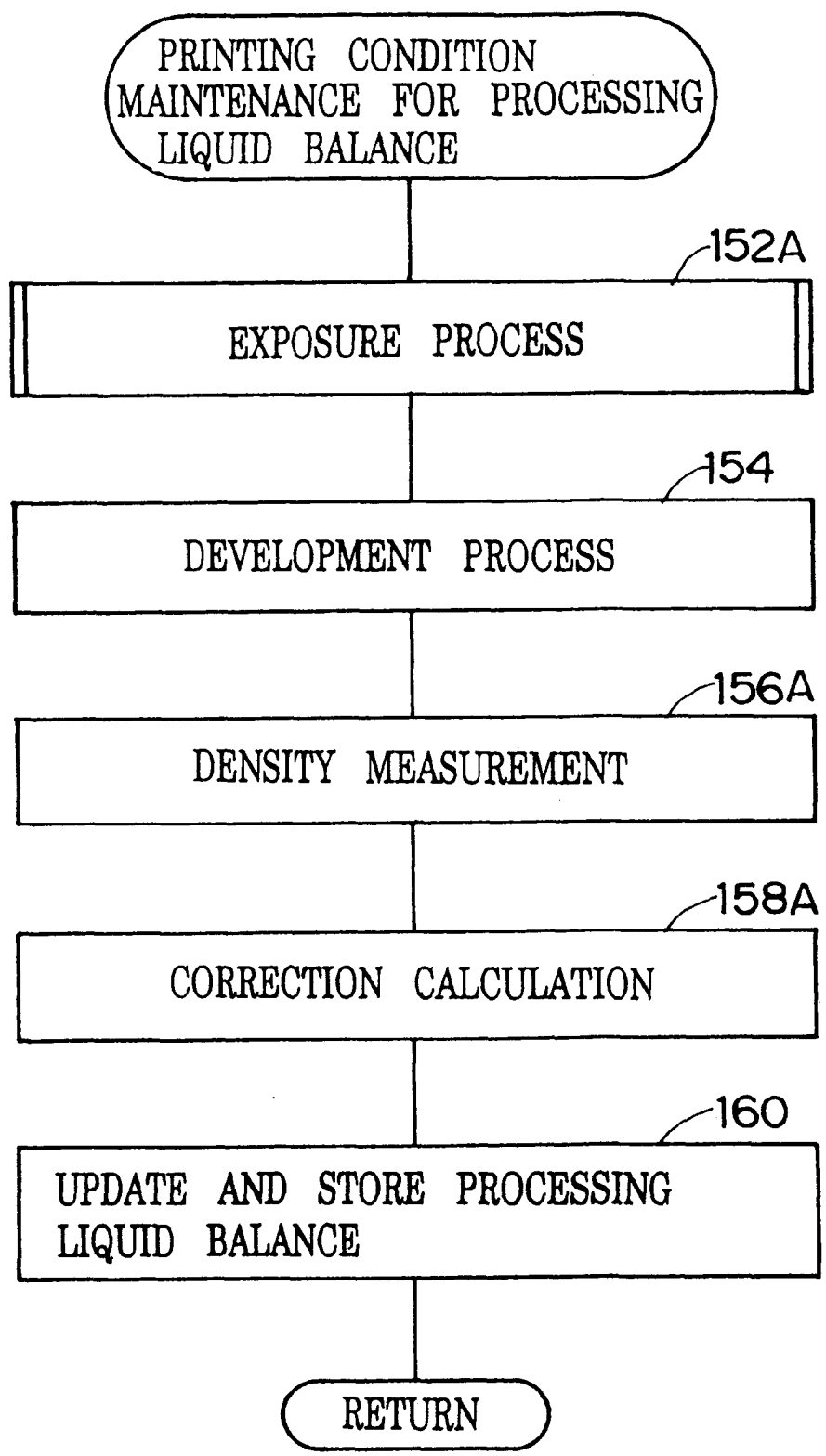
FIG. 33 is a flow chart showing a master balance printing condition maintenance subroutine in the second embodiment.
Figure 34:
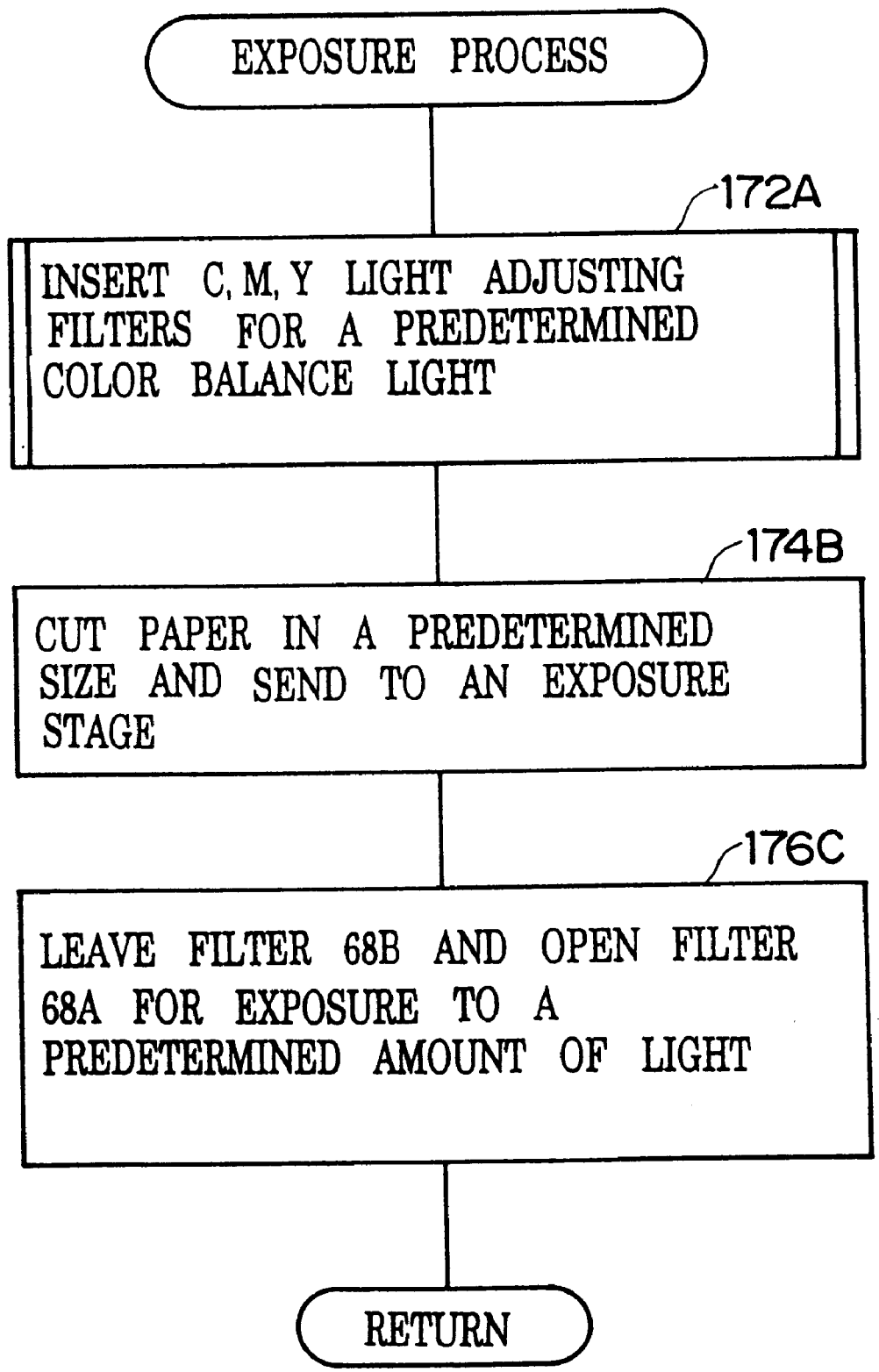
FIG. 34 is a flow chart showing an exposure process subroutine in the second embodiment.

In the following step 106A, master balance (processing solution balance) printing condition maintenance which is described in detail by FIG. 33 is carried out. In step 152A in FIG. 33, an exposure process which is shown in detail by FIG. 34 is carried out.

The exposure process shown by FIG. 34 will be explained below. Based on data obtained by light source correction, light-adjusting filters 70 for color components C (cyan), M (magenta), and Y (yellow) are first inserted so that a predetermined amount of light in a predetermined color balance can be obtained. A paper P is then cut in a predetermined size, and sent to an exposure stage (step 174B). Leaving the shutter 368B on the side of an ND filter in the black shutter untouched, the shutter on the 368A side is opened, and the paper is exposed to a predetermined amount of light (step 176C), and the procedure returns to the routine in FIG. 33.

After the exposure process as described in step 152A in FIG. 33 is finished, the procedure goes on to the following step 154. The process in the step 154 is the same as in the first embodiment, and its explanation is not provided here.

Figure 31:
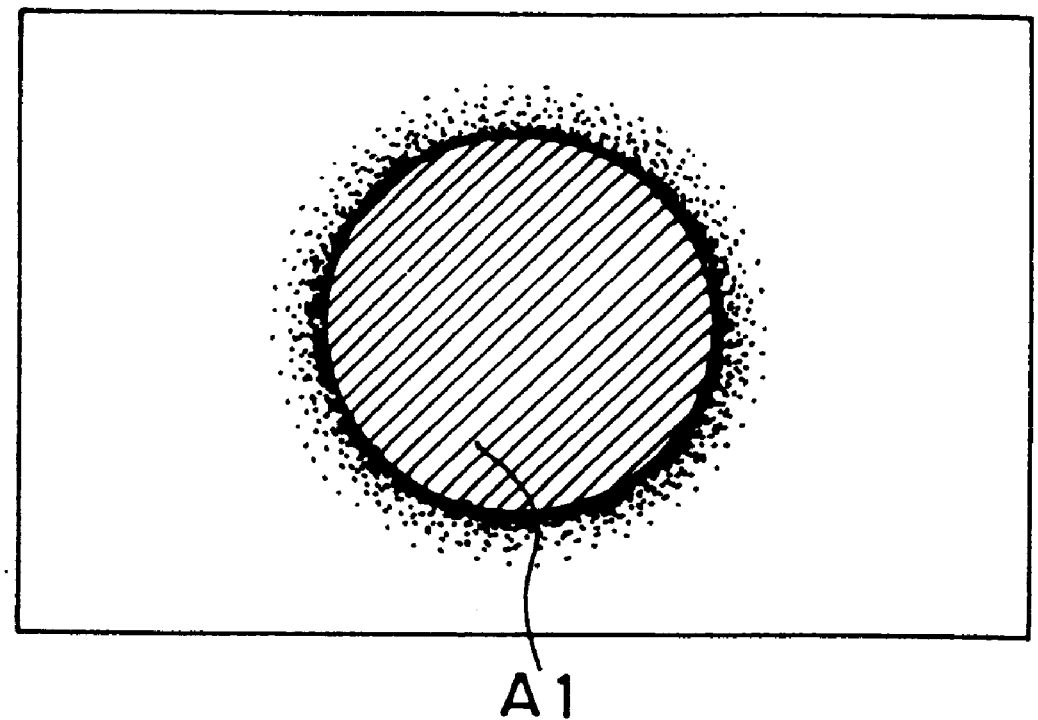
FIG. 31 shows a paper exposed to a plurality of exposure conditions in the second embodiment.

In the following step 156A, measurement of the density in the exposed area A1 shown by FIG. 31 is carried out for each color component C, M, and Y by the densitometer 22.

In the following step 158A, corrections of the exposure conditions are calculated to keep the printing density (as an example here, the printing density means the density of the exposed area A1 which should be a neutral gray. Hereafter, the density of the exposed area A1 is called "set up filter printing density.) for each color component C, M, and Y in a predetermined range. In the following step 160, the process is the same as in the first embodiment, and its explanation is omitted here.

The processing steps after the main routine step 108 in FIG. 32 are the same as in the first embodiment, and their explanation are omitted here.

In the present embodiment, same effect as obtained by the first embodiment is obtained, and its explanation is omitted here.

What is claimed is:

1. A method for determining a state of processing solution in a printer processor which exposes a photosensitive material to light emitted from a light source and processes the material with processing solution, the printer processor having a function to correct exposure conditions in response to at least the amount of light from the light source, characteristics of the photosensitive material, and a state of the processing solution as a plurality of parameters for exposure condition correction, the printer processor corrects exposure conditions by adjusting values of said plurality of parameters for exposure condition correction, said method comprising the steps of:

(a) storing a history of change of a value of at least one parameter of the plurality of parameters; and (b) determnining whether or not the state of the processing solution is in a preferable state based on the stored history of change of the value of the at least one parameter of the plurality of parameters.

2. The method according to claim 1, wherein one parameter of the plurality of parameters is a photosensitive material correction parameter for correcting an exposure condition in response to the characteristics of the photosensitive material.

3. The method according to claim 1, wherein one parameter of the plurality of parameters is a master correction parameter for correcting an exposure condition in response to the state of the processing solution.

4. A method for determining a state of processing solution in a printer processor which exposes a photosensitive material to light emitted from a light source and processes the material with processing solution, the printer processor having a function to correct exposure conditions in response to at least the amount of light from the light source, characteristics of the photosensitive material, and a state of the processing solution by adjusting values of a plurality of parameters for exposure condition correction, comprising the steps of:

(a) storing a history of change of a value of at least one parameter of the plurality of parameters; and (b) determining whether or not the state of the processing solution is in a preferable state based on the stored history of change of the value of the at least one parameter of the plurality of parameters, wherein the at least one parameter is a predetermined master correction parameter, and the printer processor adjusts the values of the parameters of the plurality of parameters corresponding to the amount of light from the light source and the characteristics of the photosensitive material, and then adjusts the value of the master correction parameter in response to the change in the processing solution state, and later performs the step (a).

5. A printer processor which performs exposure of a photosensitive material to light emitted from a light source and processing of the photosensitive material with processing solution, and which effects correction of an exposure condition in response to at least one of the amount of light from the light source and characteristics of the photosensitive material, another exposure of the photosensitive material to record a predetermined test image thereon and processing of the photosensitive material on which the predetermined test image has been recorded with the processing solution, and measurement of density of the test image which has been recorded on the processed photosensitive material, the printer processor having a function to adjust a predetermined master correction parameter value for exposure condition correction so that the measured density of the test image is in a predetermined range, comprising:

history-of-change storing means for storing a history of change of the master correction parameter value; and processing solution state determining means for determining whether or not the processing solution is in a preferable state based on the history of change of the master correction parameter value stored by the history of change storing means, wherein the processing solution state determining means determines whether or not the processing solution is in the preferable state based on one of a change rate or a change amount of the master correction parameter value adjusted latest relative to the master correction parameter value which was adjusted before the latest adjustment, and on one of a change rate and a change amount of the master correction parameter value adjusted latest relative to one of an average value of a plurality of the master correction parameter values which were adjusted during a predetermined period before the latest adjustment and an average value of the master parameter values which were adjusted before the latest adjustment for a predetermined number of times.

6. The printer processor according to claim 5 wherein the master correction parameter value which was adjusted before the latest adjustment is at least one of the master correction parameter values which were adjusted for the first time after replenishment into a processing solution processing section or exchange of the proceessing solution, and the master correction parameter value which was adjusted at the time immediately before the latest adjustment.

7. A printer processor which performs exposure of a photosensitive material to light emitted from a light source and processing of the photosensitive material with processing solution, and which effects correction of an exposure condition in response to at least one of the amount of light from the light source and characteristics of the photosensitive material, another exposure of the photosensitive material to record a predetermined test image thereon and processing of the photosensitive material on which the predetermined test image has been recorded with the processing solution, and measurement of density of the test image which has been recorded on the processed photosensitive material, the printer processor having a function to adjust a predetermined master correction parameter value for exposure condition correction so that the measured density of the test image is in a predetermined range, comprising:

history-of-change storing means for storing a history of change of the master correction parameter value;

processing solution state determining means for determining whether or not the processing solution is in a preferable state based on the history of change of the master correction parameter value stored by the history of change storing means, and prohibition means for prohibiting that the master correction parameter value is adjusted before correction of the exposure condition is effected in response to characteristics of a photosensitive material which has been newly loaded on the printer processor.

8. A printer processor which performs exposure of a photosensitive material to light emitted from a light source and processing of the photosensitive material with processing solution, and which effects correction of an exposure condition in response to at least one of the amount of light from the light source and characteristics of the photosensitive material, another exposure of the photosensitive material to record a predetermined test image thereon and processing of the photosensitive material on which the predetermined test image has been recorded with the processing solution, and measurement of density of the test image which has been recorded on the processed photosensitive material, the printer processor having a function to adjust a predetermined master correction parameter value for exposure condition correction so that the measured density of the test image is in a predetermined range, comprising:

history-of-change storing means for storing a history of change of the master correction parameter value; and processing solution state determining means for determining whether or not the processing solution is in a preferable state based on the history of change of the master correction parameter value stored by the history of change storing means, said printer processor being constructed to correct upon activation thereof, the exposure condition automatically in response to the amount of light, and then adjust the master correction parameter value automatically in response to the change in the state of the processing solution.

9. A printer processor comprising:

an exposing section for exposing a photosensitive material to light emitted from a light source to record an image thereon;

a processing solution processing section for processing the photosensitive material on which the image was recorded with processing solution;

an exposure condition correcting means for correcting an exposure condition in response to at least the amount of light from the light source, characteristics of the photosensitive material, and a change in the processing solution state as a plurality of exposure condition correction parameters, said exposure condition correcting means correcting said exposure condition by adjusting values of said plurality of exposure condition correction parameters; and a memory for storing a value of the processing solution correction parameter for correcting the exposure condition in response to the change in the processing solution state, as a value of one exposure condition correction parameter of the plurality of exposure condition correction parameters.

10. The printer processor according to claim 9 wherein
the memory is constructed so that it stores a history of change of the value of the processing solution correction parameter, and
further comprises a processing solution state determining means for determining whether or not the processing solution is in a preferable state based on the history of change of the value of the processing solution correction parameter stored in the memory.

11. The printer processor according to claim 10 which further comprises a prohibition means for prohibiting that the value of the processing solution correction parameter is adjusted before the exposure condition is corrected in response to characteristics of a photosensitive material which has been newly loaded on the printer processor.

12. The printer processor according to claim 10 wherein
the exposure condition is automatically corrected in response to the amount of light detected at the beginning of the operation and then the value of the processing solution correction parameter is automatically adjusted in response to a change in the processing solution state.

13. A printer processor comprising:
an exposing section for exposing a photosensitive material to light emitted from a light source to record an image thereon;
a processing solution processing section for processing the photosensitive material on which the image was recorded with processing solution;
an exposure condition correcting means for correcting an exposure condition in response to at least the amount of light from the light source, characteristics of the photosensitive material, and a change in the processing solution state, by adjusting values of a plurality of exposure condition correction parameters; and
a memory for storing a value of the processing solution correction parameter for correcting the exposure condition in response to the change in the processing solution state, as a value of one exposure condition correction parameter of the plurality of exposure condition correction parameters; wherein
the memory is constructed so that it stores a history of change of the value of the processing solution correction parameter, and
the printer processor further comprises a processing solution state determining means for determining whether or not the processing solution is in a preferable state based on the history of change of the value of the processing solution correction parameter stored in the memory, wherein
the processing solution state determining means determines whether or not the processing solution is in the preferable state based on one of a change rate and a change amount of the value of the processing solution correction parameter adjusted latest to the value of the processing solution correction parameter which was adjusted before the latest adjustment, and on one of a change rate and a change amount of the value of the processing solution correction parameter adjusted latest to an average value of a plurality of the values of the processing solution correction parameter which were adjusted during a predetermined period before the latest adjustment and an average value of the values of the processing solution parameter which were adjusted before the latest adjustment for a predetermined number of times.

14. The printer processor according to claim 13 wherein
the value of the processing solution correction parameter which was adjusted before the latest adjustment is
at least one of the value of the processing solution correction parameter which was adjusted for the first time after the replenishment of replenisher into the processing solution processing section, and the value of the processing solution correction parameter value adjusted immediately before the latest adjustment.

15. The printer processor according to claim 14 which further comprises a prohibition means for prohibiting the value of the processing solution correction parameter is adjusted before the exposure condition is corrected in response to characteristics of a photosensitive material has been newly loaded on the printer processor.

16. The printer processor according to claim 14 wherein
the exposure condition is automatically corrected in response to the amount of light detected at the beginning of the operation and then the value of the processing solution correction parameter is automatically adjusted in response to a change in the processing solution state.

17. The printer processor according to claim 13 which further comprises a prohibition means for prohibiting that the value of the processing solution correction parameter is adjusted before the exposure condition is corrected in response to characteristics of a photosensitive material which has been newly loaded on the printer processor.

18. The printer processor according to claim 13 wherein
the exposure condition is automatically corrected in response to the amount of light detected at the beginning of the operation and then the value of the processing solution correction parameter is automatically adjusted in response to a change in the processing solution state.

19. A printer processor comprising:
an exposing section for exposing a photosensitive material to light emitted from a light source to record an image thereon;
a processing solution processing section for processing the photosensitive material on which the image was recorded with processing solution;
an exposure condition correcting means for correcting an exposure condition in response to at least the amount of light from the light source, characteristics of the photosensitive material, and a change in the processing solution state, by adjusting values of a plurality of exposure condition correction parameters;
a memory for storing a value of the processing solution correction parameter for correcting the exposure condition in response to the change in the processing solution state, as a value of one exposure condition correction parameter of the plurality of exposure condition correction parameters; and
a prohibition means for prohibiting that the value of the processing solution correction parameter is adjusted before the exposure condition is corrected in response to characteristics of a photosensitive material which has been newly loaded on the printer processor.

20. The printer processor according to claim 19 wherein
the exposure condition is automatically corrected in response to the amount of light detected at the beginning of the operation and then the value of the processing solution correction parameter is automatically in response to a change in the processing solution state.

21. A printer processor comprising:

an exposing section for exposing a photosensitive material to light emitted from a light source to record an image thereon;

a processing solution processing section for processing the photosensitive material on which the image was recorded with processing solution;

an exposure condition correcting means for correcting an exposure condition in response to at least the amount of light from the light source, characteristics of the photosensitive material, and a change in the processing solution state, by adjusting values of a plurality of exposure condition correction parameters; and a memory for storing a value of the processing solution correction parameter for correcting the exposure condition in response to the change in the processing solution state, as a value of one exposure condition correction parameter of the plurality of exposure condition correction parameters, wherein the exposure condition is automatically corrected in response to the amount of light detected at the beginning of the operation and then the value of the processing solution correction parameter is automatically adjusted in response to a change in the processing solution state.

22. A printer processor comprising:

an exposing section for exposing a photosensitive material to light emitted from a light source to record an image thereon;

a processing solution processing section for processing the photosensitive material on which the image was recorded with processing solution;

an exposure condition correcting means for correcting an exposure condition in response to at least one of: the amount of light from the light source, characteristics of the photosensitive material, and a change in the processing solution state, by adjusting values of a plurality of exposure condition correction parameters; and a memory for storing a value of the processing solution correction parameter for correcting the exposure condition in response to the change in the processing solution state, as a value of one exposure condition correction parameter of the plurality of exposure condition correction parameters; wherein the memory is constructed so that it stores a history of change of the value of the processing solution correction parameter, and the printer processor further comprises a processing solution state determining means for determining whether or not the processing solution is in a preferable state based on the history of change of the value of the processing solution correction parameter stored in the memory, wherein the processing solution state determining means determines whether or not the processing solution is in the preferable state based on one of a change rate and a change amount of the value of the processing solution correction parameter adjusted latest to the value of the processing solution correction parameter which was adjusted before the latest adjustment, and on one of a change rate and a change amount of the value of the processing solution correction parameter adjusted latest to an average value of a plurality of the values of the processing solution correction parameter which were adjusted during a predetermined period before the latest adjustment and an average value of the values of the processing solution parameter which were adjusted before the latest adjustment for a predetermined number of times.

23. A printer processor comprising:

an exposing section for exposing a photosensitive material to light emitted from a light source to record an image thereon;

a processing solution processing section for processing the photosensitive material on which the image was recorded with processing solution;

an exposure condition correcting means for correcting an exposure condition in response to at least one of: the amount of light from the light source, characteristics of the photosensitive material, and a change in the processing solution state, by adjusting values of a plurality of exposure condition correction parameters;

a memory for storing a value of the processing solution correction parameter for correcting the exposure condition in response to the change in the processing solution state, as a value of one exposure condition correction parameter of the plurality of exposure condition correction parameters; and a prohibition means for prohibiting that the value of the processing solution correction parameter is adjusted before the exposure condition is corrected in response to characteristics of a photosensitive material which has been newly loaded on the printer processor.

24. A printer processor comprising:

an exposing section for exposing a photosensitive material to light emitted from a light source to record an image thereon;

a processing solution processing section for processing the photosensitive material on which the image was recorded with processing solution;

an exposure condition correcting means for correcting an exposure condition in response to at least one of: the amount of light from the light source, characteristics of the photosensitive material, and a change in the processing solution state, by adjusting values of a plurality of exposure condition correction parameters; and a memory for storing a value of the processing solution correction parameter for correcting the exposure condition in response to the change in the processing solution state, as a value of one exposure condition correction parameter of the plurality of exposure condition correction parameters, wherein the exposure condition is automatically corrected in response to the amount of light detected at the beginning of the operation and then the value of the processing solution correction parameter is automatically adjusted in response to a change in the processing solution state.

* * * * *